United States Patent [19]

Balogh, Jr. et al.

[11] 3,725,872

[45] Apr. 3, 1973

[54] DATA PROCESSING SYSTEM HAVING STATUS INDICATING AND STORAGE MEANS

[75] Inventors: Edward Balogh, Jr., Diamond Bar; James Russell Bennett, Glendora; William F. Keenan, Goleta; William A. Logan, Covina; John S. Murphy, Altadena, all of Calif.

[73] Assignee: Burroughs Corporation, Detroit, Mich.

[22] Filed: Mar. 3, 1971

[21] Appl. No.: 120,717

Related U.S. Application Data

[63] Continuation of Ser. No. 804,613, March 5, 1969.

[52] U.S. Cl. ....... 340/172.5

[51] Int. Cl. ....... G06f 9/18, G06f 15/16

[58] Field of Search ....... 340/172.5

[56] References Cited

UNITED STATES PATENTS

| | | | |
|---|---|---|---|
| 3,377,624 | 4/1968 | Nelson et al. | 340/172.5 |
| 3,405,394 | 10/1968 | Dirac | 340/172.5 |
| 3,435,418 | 3/1969 | Evans et al. | 340/172.5 |
| 3,465,297 | 9/1969 | Thomas et al. | 340/172.5 |
| 3,469,239 | 9/1969 | Richmond et al. | 340/172.5 |
| 3,473,159 | 10/1969 | Cantrell et al. | 340/172.5 |
| 3,528,061 | 9/1970 | Zurcher, Jr. | 340/172.5 |
| 3,576,544 | 4/1971 | Cordero et al. | 340/172.5 |

*Primary Examiner*—Raulfe B. Zache
*Attorney*—Christie, Parker & Hale

[57] ABSTRACT

Status indicating and storage means for an addressable memory shared by a plurality of disc file control units. The control means provide addresses to the memory for initiating an access therein and provide the same address to the status indicating and storage means. The status indicating and storage means receives the address and has a memory in which received addresses are stored together with an associated indicium. The indicium indicates whether the corresponding address is in use. The status indicating and storage means is operative for providing an output indication of a stored indication of use for a received address.

26 Claims, 11 Drawing Figures

INVENTORS
EDWARD BALOGH, JR.
JAMES RUSSELL BENNETT
WILLIAM F. KEENAN
WILLIAM A. LOGAN
JOHN S. MURPHY

BY: Christie, Parker & Hale
ATTORNEYS

DATA PROCESSING SYSTEM HAVING STATUS INDICATING AND STORAGE MEANS

This is a continuation of patent application U.S. Ser. No. 804,613, filed Mar. 5, 1969.

BACKGROUND OF THE INVENTION

1. Field of the Invention

This invention relates to digital computers and, more particularly, to a status indicating and storage device for a plurality of objects accessible by any one of a plurality of subsystems in the overall system. In a preferred embodiment of the invention the objects are storage locations in a shared memory device.

2. Description of the Prior Art

Modern data processing systems often have a number of different subsystems sharing a common memory. Subsystems include software programs or hardware units such as processors or controllers for peripheral devices, etc. Such an arrangement creates a problem. For example, many times one of the subsystems may read information (nondestructively) from a particular address in the shared memory in order to update the information, and to rewrite the updated information. Should a second subsystem also read the same information to update it before the updated information is rewritten by the first subsystem, an error could occur. Accordingly, a need has arisen for some means for controlling access to or for providing status information about common areas of storage for two or more subsystems.

Several attempts have been made at solving this problem but all have disadvantages.

One approach to the problem has been to store a special lock bit with each piece of information to be shared by two or more subsystems. When the particular piece of information is read (nondestructively) by a subsystem for updating, the special lock bit is set in the stored information so that it indicates that the information is locked out or, stating it differently, is in the process of being updated. Special circuitry is responsive to the special lock bit to prevent another subsystem from using the information until after the information has been updated and the special lock bit set to an unlocked condition.

Another prior art approach has been to store addresses of storage locations whose contents are being updated. The addresses are stored in prefixed areas of the working memory for a data processor. Each data processor instruction contains an address for the working memory and special bits to designate if the associated address is to be compared with the addresses in the prefixed area of memory to determine if the corresponding address is one of the locked out addresses. If the address in the instruction is found to be present in the prefixed memory area, the address is locked and is not to be used until it has been unlocked by a removal of such address from the prefixed area of working memory.

There are a number of disadvantages to the aforementioned prior art approaches to the problem. Generally, elaborate time consuming communication with the shared memory is needed. Another disadvantage arises because the addresses are permanently locked out. In other words, subsystems are not allowed to use information at a locked address rather than giving the programmer the option of making use of the information. Another significant disadvantage in the prior art approach is that once a subsystem has determined that an address is locked, the only way that such subsystem can determine when the address is subsequently unlocked is to keep interrogating until it is found that the address is unlocked. This technique is undesirable as a subsystem wastes considerable time in interrogating to determine when an address is unlocked. A further disadvantage is that valuable memory space is used up by the instructions which contain bits to identify whether the associated address is to be compared against a memory area to determine if it is locked.

SUMMARY OF THE INVENTION

One embodiment of the present invention comprises a status indicating and storage unit for a plurality of objects which are shared by a number of different means. Designations of individual shared objects are stored in the status indicating and storage means along with an associated indication of whether the associated object is in use. The indicating and storage means receives a designation of an object and provides an output indication if such object is indicated to be in use.

In a preferred embodiment of the invention the objects are memory locations in a shared memory and the designations are addresses of the memory locations. In a preferred form of the preferred embodiment a plurality of different means provide addresses to the status indicating and storage means and a contention indicator is stored in association with each address for each means which provides memory addresses. The contention indicators are set to a predetermined condition when the corresponding means which provides memory addresses provides an address at a time when such address is in use. This is an important feature of one embodiment of the invention because the status indicating and storage means has a record of those means which have provided an address when such address has already been in use. Another preferred embodiment of the present invention includes means for automatically scanning through the addresses contained in the status indicating and storage means to ascertain those addresses which have an associated indication that the address is contended for and presently indicated not in use. A signal can automatically be provided to a particular means for providing addresses when an address is no longer in use but is contended for by the particular means. This feature is important as it can save considerable time in a data processing system sharing a common memory.

An important feature of the present invention is that the status indicating and storage means may be a unit separate from the other units in the system and thereby added or removed from the system as desired.

An important feature contributing to the independent nature of the status indicating and storage means, in accordance with a preferred embodiment of the invention, is that the status indicating and storage means operates in response to operators for marking objects or memory addresses in use and not in use and for other interrogation operations.

The aforementioned embodiments of the present invention can be used to eliminate the disadvantages mentioned hereinabove in regard to the prior art. In this regard, multiple systems can share a common memory making use of a common status indicating and storage means as a vehicle for providing status information regarding commonly used memory locations. Additionally, the addresses which are used need not be permanently locked out when in use but, instead, the status indicating and storage means can be used merely to provide status information regarding a particular address. Thus, for example, at the same time that the status of an address is being ascertained the contents of such address can be read from the common memory. In this manner, the information can be used or disregarded as desired by the programmer for the system. Additionally, the status indicating and storage means operates very rapidly without causing system delay.

In accordance with one preferred embodiment of the present invention, the status indicating and storage means can provide a number of different types of status information regarding a particular address and regarding the status indicating and storage means itself. For example, an indication can be provided as to whether a particular address is in use, whether an address has been previously contended for while in use, and whether the memory in the status indicating and storage means is full and cannot take a new address.

Other features may be achieved in various embodiments of the invention. For example, an address stored in the status indicating and storage means need not be the only address indicated thereby as being in use. For example, the address may be the address of the beginning of a series of memory locations. The number of such memory locations may be determined programmatically by the rest of the system. Additionally, in a preferred embodiment a special scanning technique is employed for the memory in the status indicating and storage means which tends to use the oldest contended for addresses first.

An important point to be noted in regard to the present invention is that the status indicating and storage means is not restricted to use with a shared memory in accordance with the broader concepts of the invention. For example, the status indicating and storage means could be used with other types of devices, such as line printers. In such an application the addresses would be designations of particular line printers in the system, rather than of memory locations, the use indicator could be used to indicate when the corresponding line printer is in use, and the contention indicators would be used to indicate that a particular line printer has been contended for but was found to be in use. Another application for the status indicating and storage means would be in a data communication system where there are multiple paths for the communication of data. In such an application, the addresses stored in the status indicating and storage means could be replaced by designations of particular communication paths.

DESCRIPTION OF THE PREFERRED EMBODIMENT

General Description

Figure 1:
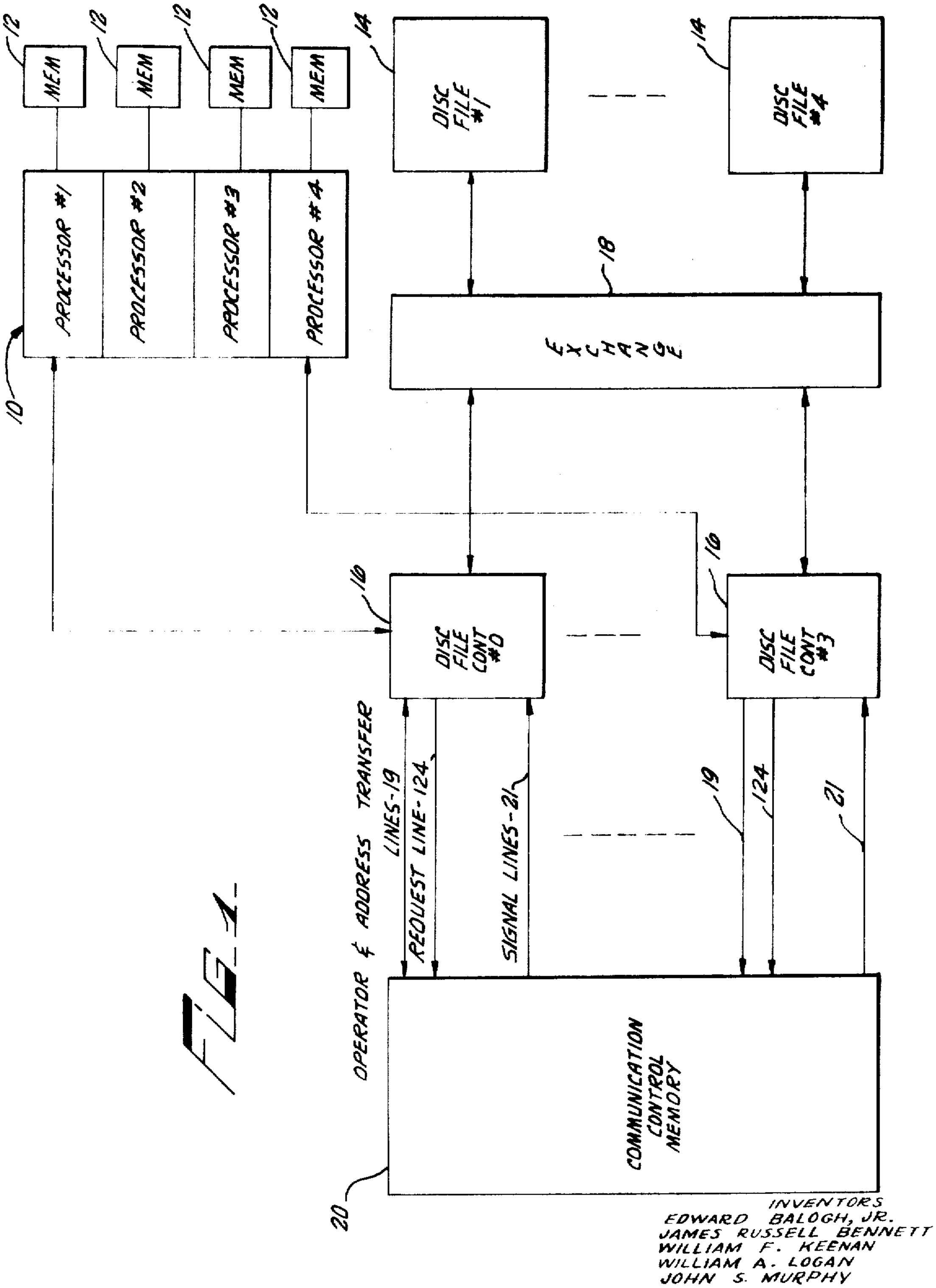
FIG. 1 is a block diagram of a data processing system employing a communication control memory and embodying the present invention.

FIG. 1 shows a block diagram of a data processing system and embodying the present invention. Included are data processors indicated generally at 10. Four data processors identified as No. 1 through No. 4 are shown. Associated with the data processors are memories 12. Memories 12 are the main working memories for the data processors 10. The data processors 10 are conventional data processors which operate in response to multiple stored programs making use of the working memories 12. Additionally, four disc file units 14 are provided. Each disc file 14 is a disc file memory device well known in the computer art which has rotating discs along with transducers for reading and writing on the discs.

The data processors 10 use the disc files 14 as auxiliary memory devices. The processors 10 normally use the working memories 12 during data processing operations but utilize the disc files 14 for the storage of information which cannot be kept in the working memories 12 because of the limitation of memory space. Thus, the disc files 14 form a common or shared memory system for the processors.

The processors 10 communicate with the files 14 by instructions. Each instruction used for communication with a disc file contains an operator designating whether a read or write operation is to take place, an address identifying a disc file 14 and the actual storage locations in the disc file at which the particular read or write operation is to take place, and other incidental information commonly required for such accesses.

Four discs file control units 16 are shown by way of example for executing the disc file instructions provided by the processors 10. In the example of the invention shown herein a different disc file control is associated with each data processor. Thus, each data processor sends an instruction to the corresponding disc file control and receives signals back therefrom. An exchange 18 is provided between the disc file controls 16 and the disc files 14. The exchange 18 allows any one of the disc file controls 16 to communicate with any one of the four disc files 14. The particular disc file 14 in which information is to be read by a particular disc file control 16 is designated in the address in the instruction received from the data processor. Thus, the disc files 14 also form a shared or common memory for the disc file control units 16 and the data processors 10.

Each of the four disc file control units 16 is connected to a communication control memory 20 which embodies the present invention. The communication control memory is a status indicating and storage means which stores the addresses for the disc files 14. The communication control memory 20 also stores indicia with each address concerning the status of the stored addresses. Specifically, an indicium or indication of whether a stored address is in use is stored with each address. Additionally, indicia or indications are stored with each address indicating whether one of the disc file controls 16 has contended for such address at a time when it is marked by indicium as in use. Indicia or indications are also stored with each address identifying the disc file control which caused the address to be marked by indicium as in use. The above-mentioned indicia or indications are binary coded bits contained in a control character.

The communication control memory 20 is also operative for providing signals to the disc file control thereby communicating the status of the stored addresses and indicating when previously contended for addresses are no longer in use.

The communication control memory 20 operates in response to operators received from the disc file controls 16, and a control signal on a request line 124. The operator designates the particular operation which is to take place in the communication control memory 20 and a control signal on the request line 124 initiates execution of the operator.

For purposes of explanation, three different operators executed by the communication control memory 20 are described. These operators are:

a LOCK ADDRESS operator, an UNLOCK I operator, and an UNLOCK II operator.

Other operators may also be executed but need not be explained here for a complete understanding of the invention.

In operation a disc file control unit 16 receives an instruction from the corresponding processor 10 indicating that an access is to be made to one of the disc files 14. The disc file control 16 receiving the instruction is operative to decode the data processor operator and apply the decoded operator to the operator and address transfer lines 19. Simultaneously with application of the decoded operator to the lines 19 a control signal is applied on the corresponding request line 124 by the disc file control. The communication control memory 20 if "available," is responsive to the control signal for reading the operator and initiating the operation specified thereby. The communication control memory 20 is said to be "available" if it is not executing a decoded operator.

Assume that the decoded operator on the operator and address transfer lines 19 is a LOCK ADDRESS operator. A LOCK ADDRESS operator specifies that the address in the corresponding data processor instruction is to be marked as being locked or in use. The disc file control 16 applies the address on the operator and address transfer lines 19. Each address is composed of four characters which are applied serially, character by character, on the lines 19. The communication control memory 20 reads the four characters of the address one at a time and stores them in a register (shown in FIG. 2) contained therein.

A memory (shown in FIG. 2) is located in the communication control memory 20 in which disc file addresses and, associated with each address, a control character are stored. The communication control memory 20 takes the address and looks for that address in the memory thereof or an available storage location in the memory (if the address is not stored in memory). If that address is located or a storage location in the memory is available, a control character is formed. A binary coded "lock" bit or indicium is placed in the control character which indicates that the address is locked. Also, binary coded "system identification" bits or indicia are placed in the control character which indicate which disc file control caused the address to be locked. The address and the control character are then stored into the same storage location of the memory as the disc file address was originally stored or in the available storage location of the memory, as the case may be. Then a signal is applied on the signal lines 21 indicating to the initiating disc file control 16 that the required operation is complete.

If the address is present in memory and the particular address had been previously marked by indicium in the control character as being in use at the time that the LOCK ADDRESS operator is received, then a control signal will be applied on the signal lines 21 indicating to the disc file control 16 that the particular address is in use. Additionally, the communication control memory 20 will set a binary coded "contended for" bit or indicium in the control character associated with such address which indicates that such disc file control has "-contended" for the address at a time when it was marked locked or in use.

The signals on the signal lines 21 are coded and sent back by the disc file control 16 in a special return control word to the data processor 10 which sent the initial instruction. The program for that particular data processor decides what should be done, if anything, in light of the control information sent on the signal lines 21.

At the same time that the LOCK ADDRESS operator is executed by the communication control memory, the disc file control which sent the instruction reads the address in the disc file and sends the information to the corresponding data processor for updating purposes. If for some reason the address is locked or in use (meaning the information is already being updated) the return control word will so notify the data processor causing appropriate action to be taken.

As a data processor sends the updated information back to the disc file control for writing in the disc file, another instruction is initially sent to the corresponding disc file control. The instruction contains an operator which is decoded and applied on the operator and address transfer lines 19. Simultaneously, with application of the operator to lines 19 a control signal is applied on the corresponding request line 124. The operator applied on the lines 19 is an UNLOCK I operator. The UNLOCK I operator indicates that updated information is now to be rewritten into the particular location from which it was initially read and that if the write operation is successful the particular address will then be unlocked or marked not in use.

The communication control 20, if available, is responsive to the control signal on the request line 124 for reading the UNLOCK I operator appearing on the lines 19. The disc file control 16 containing the instruction then sends out the four address characters from the same instruction on the lines 19 and the communication control memory 20 again stores the address in a register and compares the address with the addresses contained in the memory thereof. When an equality is detected the address and associated control character is read out and a designation of the particular storage location in the memory from which the address and the associated control character are read is stored in what is referred to as an "unlock" register, (shown in FIG. 2). Control signals are then applied on the signal lines 21 indicating that the UNLOCK I operation is complete and that the address is still properly marked as being locked.

While the UNLOCK I operator is being executed by the communication control memory 20 the same disc file control 16 which sent the operator simultaneously causes a write operation to take place in the address of the disc file designated by the address sent to the communication control memory 20.

Once the information is successfully rewritten into the disc file the disc file control automatically forms an UNLOCK II operator on the operator and address transfer lines 19. The disc file control 16 also applies a control signal on the request line 124 causing the communication control memory 20 to read an UNLOCK II operator. No address is required in an UNLOCK II operator, accordingly, the communication control memory 20 does not receive an address. No address is required because the primary purpose of the UNLOCK II operator is to unlock the address which has already been provided to the communication control memory 20 during the UNLOCK I operator.

The "unlock" register in the communication control memory 20 contains a designation of a storage location for the memory. The storage location contains the address in the disc files where the updated information has just been written. The address and associated control character are now obtained from the memory in the communication control memory and the lock bit in the control character is changed to indicate that the associated address is no longer locked. The address and associated control character (now modified) are stored back into the same storage location for future use as required. Communication control memory 20 then sends a signal on the signal lines 21 back to the same disc file control 16 which sent the operator, indicating that the corresponding address has been successfully unlocked. The disc file control 16 in turn sends a return control word back to the corresponding data processor, indicating that everything has been successfully completed and that the address is now unlocked.

The control character stored in association with an address in the communication control memory 20 contains four contention bits, one contention bit for each of the disc file controls 16. When a particular disc file control 16 attempts to lock or unlock an address in the communication control memory 20 which has already been locked, the contention bit for the corresponding disc file 16 is set to a condition indicating that the corresponding disc file control is contending for access to the particular address. At the same time that the communication control memory 20 applies a signal on the signal lines 21 indicating that an address has been successfully unlocked, an interrupt signal is applied on the signal lines 21. The interrupt signal is sent to each disk file control whose corresponding contention bit is set indicating that the disc file control has contended for the address that is now unlocked.

The communication control memory 20 has a float scan operation which takes place at the end of the LOCK ADDRESS operator and UNLOCK I operator operations. The float scan operation causes the addresses contained in the communication control memory 20 to be scanned in a novel manner and any word which is marked as being unlocked but contended for is utilized to signal the corresponding disc file control 16 that the address is now unlocked and can be accessed.

DETAILED DESCRIPTION

Figure 2:
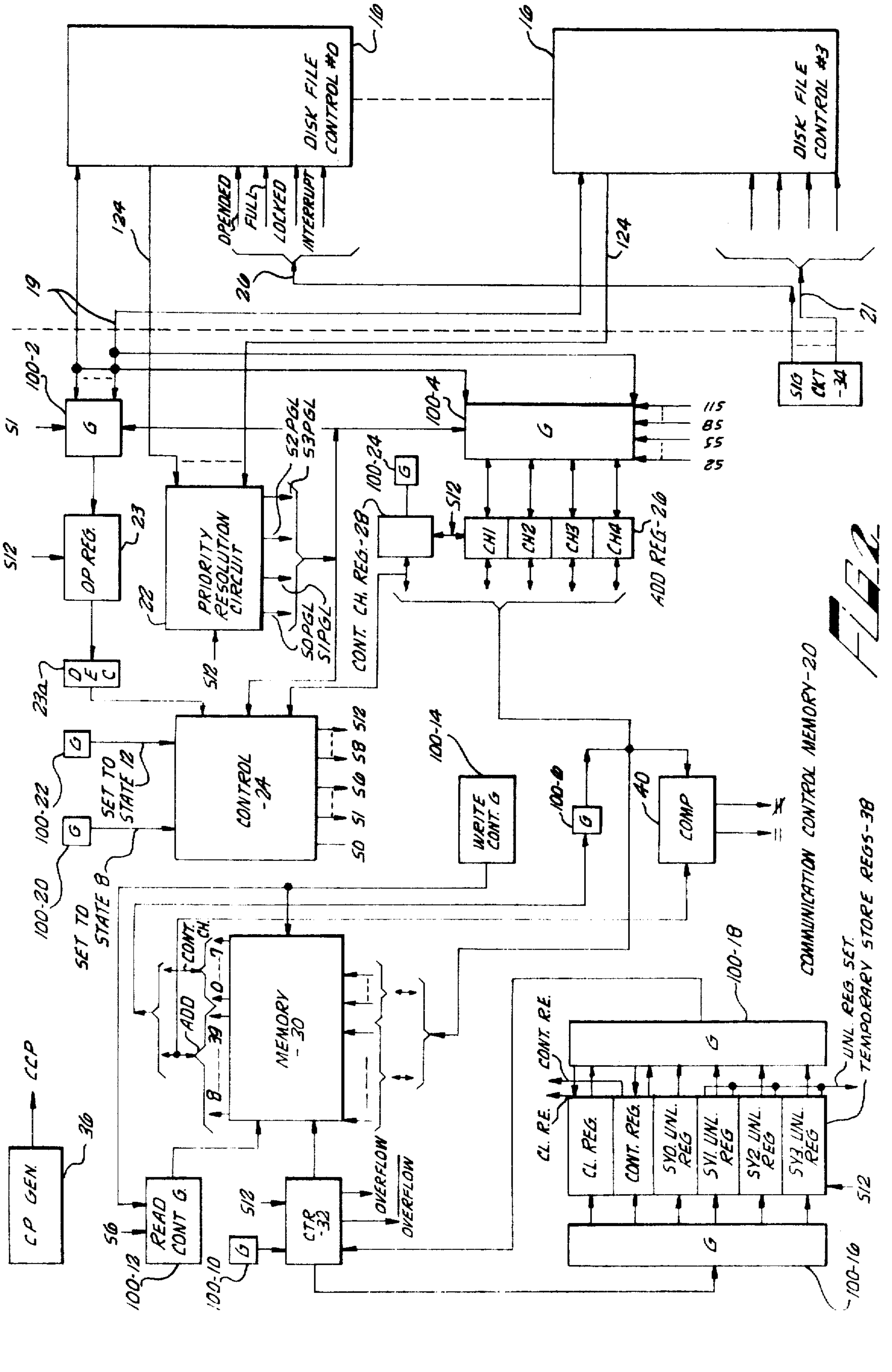
FIG. 2 is a more detailed block diagram of the communication control memory and the disc file control unit of FIG. 1.

Refer now to the details of the communication control memory 20 as shown in FIG. 2. The communication control memory 20 is shown to the left of the dashed lines. The request lines 124 from each disc file control are connected to a priority resolution circuit 22. The priority resolution circuit 22 cab be any one of a number of different circuits well known in the computer art. Basically, the priority resolution circuit 22 applies a control signal on one of the output lines S0PGL, S1PGL, S2PGL and S3PGL, corresponding to the disc file control No. 0 through No. 3, whenever a control signal has been applied by the corresponding disc file control and the memory is available for interrogation. The output lines S0PGL through S3PGL receiving the control signal corresponds to the disc file control applying the control signal on the request lines 124. The priority resolution circuit 22 applies the control signal on the particular output line until a control signal is received at the S12 output from a control unit 24. At such time the control signal is removed from the output of the priority resolution circuit 22, the priority resolution circuit 22 applies signals at its output circuit on a first come first serve basis. In other words, the first disc file control 16 to apply a control signal to the priority resolution circuit 22 is the first to have a control signal applied to the corresponding output circuit of the priority resolution circuit. The last disc file control to apply a control signal to the priority resolution circuit 22 is the last to have a control signal applied at the corresponding output of the priority resolution circuit 22.

Although not specifically shown in the drawing, a signal is sent by the priority resolution circuit 22 back to the disc file control 16 which has had priority granted. After receiving this signal such disc file control proceeds to send the four characters of an address to the communication control memory 20, as described hereinabove.

An operator register 23 is provided for storing the decoded operators received from the disc file controls 16.

Figure 6:
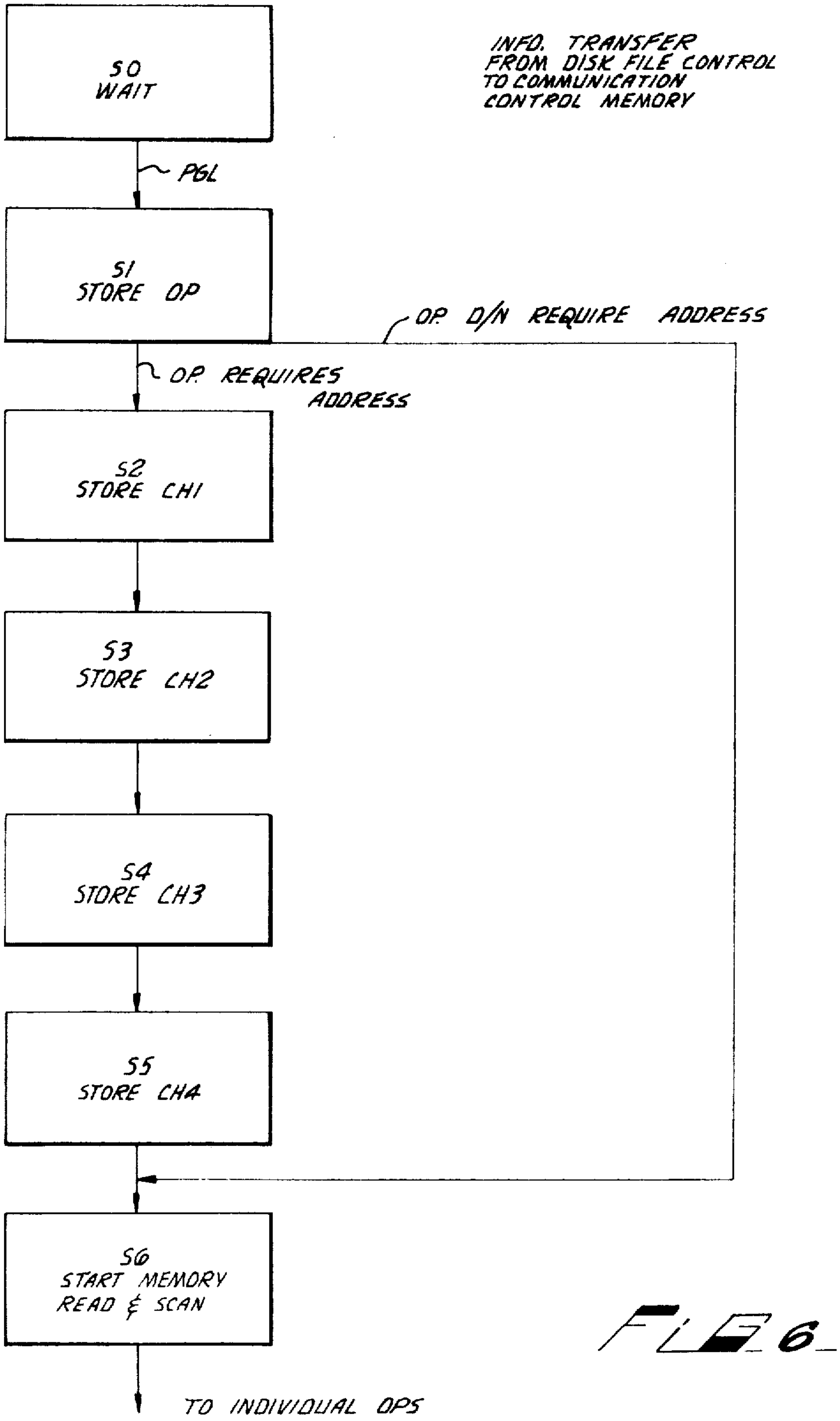
FIG. 6 is a flow diagram illustrating the sequence of operation of the communication control memory during an initial information transfer from the disc file control to the communication control memory.

The output of the operator register 23 is coupled through a decoder 23a to a control unit 24. The control unit 24 contains a sequence counter and gating (not shown) for sequencing the operation of the system and for causing control signals at outputs referenced by the symbols S0 through S12. The control unit 24 is a conventional control unit, the details of most of which need not be shown for a complete understanding of the present invention. However, the operation is illustrated in the flow charts of FIGS. 6 and 11.

Figure 4:
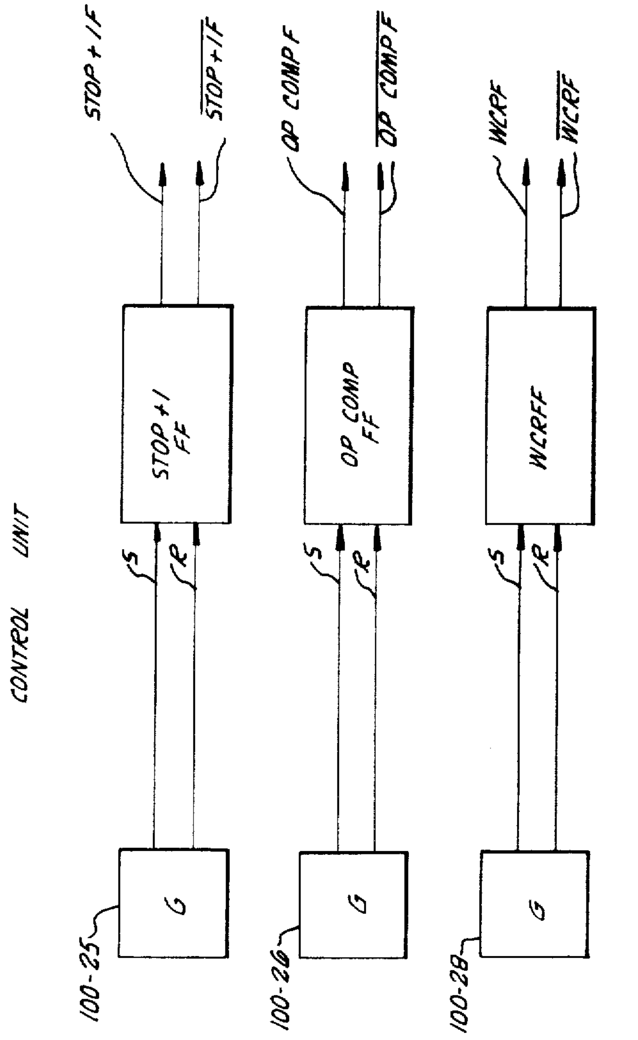
FIG. 4 is a block diagram showing three of the flip-flops and their associated gating contained in the control unit of FIG. 2.

Three of the flip-flops and their gating in the control unit 24 are shown in FIG. 4 and are referenced by the symbols STOP+1FF, OP.COMP.FF, and WCRFF.

The control character register (CONT.CH.REG.) 28 and address register (ADD.REG.) 26 are also shown in FIG. 2. The address register 26 has four sections for storing the four characters of an address. The four sections in which the four characters are stored are referenced by the symbols CH1–CH4. It should be noted that both the CONT.CH.REG. 28 and each of the four sections of the ADD.REG.26 are composed of flip-flop circuits well known in the computer art. The CONT.CH.REG. 28 has eight flip-flops for storing eight bits of a control character. Each of the four sections of the ADD.REG.26 contains eight flip-flops for storing the eight binary bits of a character of an address.

A memory 30 stores addresses and associated control characters. The memory 30 has a plurality of memory addresses. Each memory address contains 32 cells for storing the four characters making up one address and eight additional cells for storing the 8 bits of a control character. The address (ADD) and control character (CONT.CH.) outputs from the memory 30 are indicated in FIG. 2.

A counter 32 is provided for counting through a sequence of states corresponding to the different storage locations in the memory 30. There is a unique state of the counter 32 for each memory location. The counter starts at state 0 and goes up to a maximum state following which it recycles back to state 0. When the counter 32 recycles back to state 0 it generates a control signal at an OVERFLOW output for one clock period. At all other times the counter 32 forms a control signal at the $\overline{\text{OVERFLOW}}$ output.

Six temporary store registers 38 are provided. The six registers include a clear register (CL.REG.) a control register (CONT.REG.) and system 0 unlock register (SYO.UNL.REG.) through system 3 unlock register (SY3.UNL.REG.). The temporary store registers 38 are provided for storing various indications or states of the counter 32 as will be described in more detail hereinafter.

A compare unit 40 compares the address read out of the memory 30 with the address contained in the address register 26. The compare unit 40 contains conventional logic which compares the two addresses and forms a control signal at an = output when the two addresses are equal and a control signal at a ≠ output when the two addresses are not equal. A source of clock pulses 36 forms evenly spaced clock pulses for synchronization of the circuits.

Figure 3:
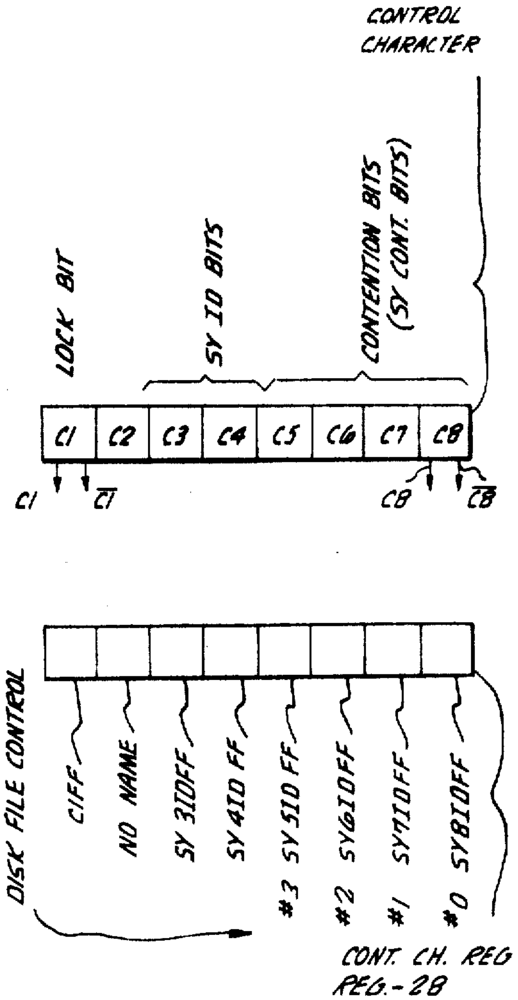
FIG. 3 is a sketch illustrating the format of the control character stored in association with each address in the memory of the communication control memory. Additionally, the flip-flops of the control character register into which the control character is stored are illustrated.

The format of a control character is shown in FIG. 3. A control character has eight binary bits referenced by the symbols C1 through C8, each of which are represented in the binary system of notation by a 0 or 1. Bit C1 is called the lock bit and indicates whether the associated address is locked (in use) or unlocked (not in use). Bit C2 is of no importance to this invention, bits C3 and C4 are called the system identification bits (SYID bits) and identify the particular system which caused the associated address to be locked. Table I at the end of this specification shows the disc file control system 16 corresponding to each combination of states for the SYID bits. Bits C5 through C8 of the control character identify the particular control system or control means which contended for or requested access to a particular address and found the particular address locked or in use. Control system or control means in this connection can have a number of different meanings. In the example shown one disc file control and the corresponding processor is a control system or control means and, hence, the bits C5 through C8 correspond to processors No. 4 through No. 1, respectively, which in turn correspond to disc file controls No. 3 through No. 0, respectively.

However, in a system where more than one disc file control is associated with one data processor control system control means would include the data processor and associated disc file controls. In a system where there are multiple processors associated with one or more disc file controls, control system or control means would refer to all associated data processors and disc file controls.

The flip-flops in the CONT.CH.REG. are referenced by the symbols C1FF, no name, and SY3IDFF through SY8IDFF. The bits of the control characters are stored in the flip-flops of the CONT.CH.REG.28 bearing the same numbers as indicated by the positioned relationship in FIG. 3.

The memory 30 may be any one of a number of different types well known in the computer art. A read control gate 100-12 applies read control signals to the memory 30 which causes the content of the storage location corresponding to the state of the counter 32 to be read out and applied to the ADD and CONT.CH. outputs. The signals from the storage location are continuously applied at the outputs ADD and CONT.CH. until either the read control gate removes the read signal or the counter 32 is counted to another state, causing the contents of another memory location to be read out and applied at the outputs.

A write control gate 100-14 applies write control signals to the memory 30. The memory 30 is responsive to a write control signal for storing the output of the CONT.CH.REG.28 and the ADD.REG.26 into the memory location corresponding to the state of the counter 32.

Figure 5:
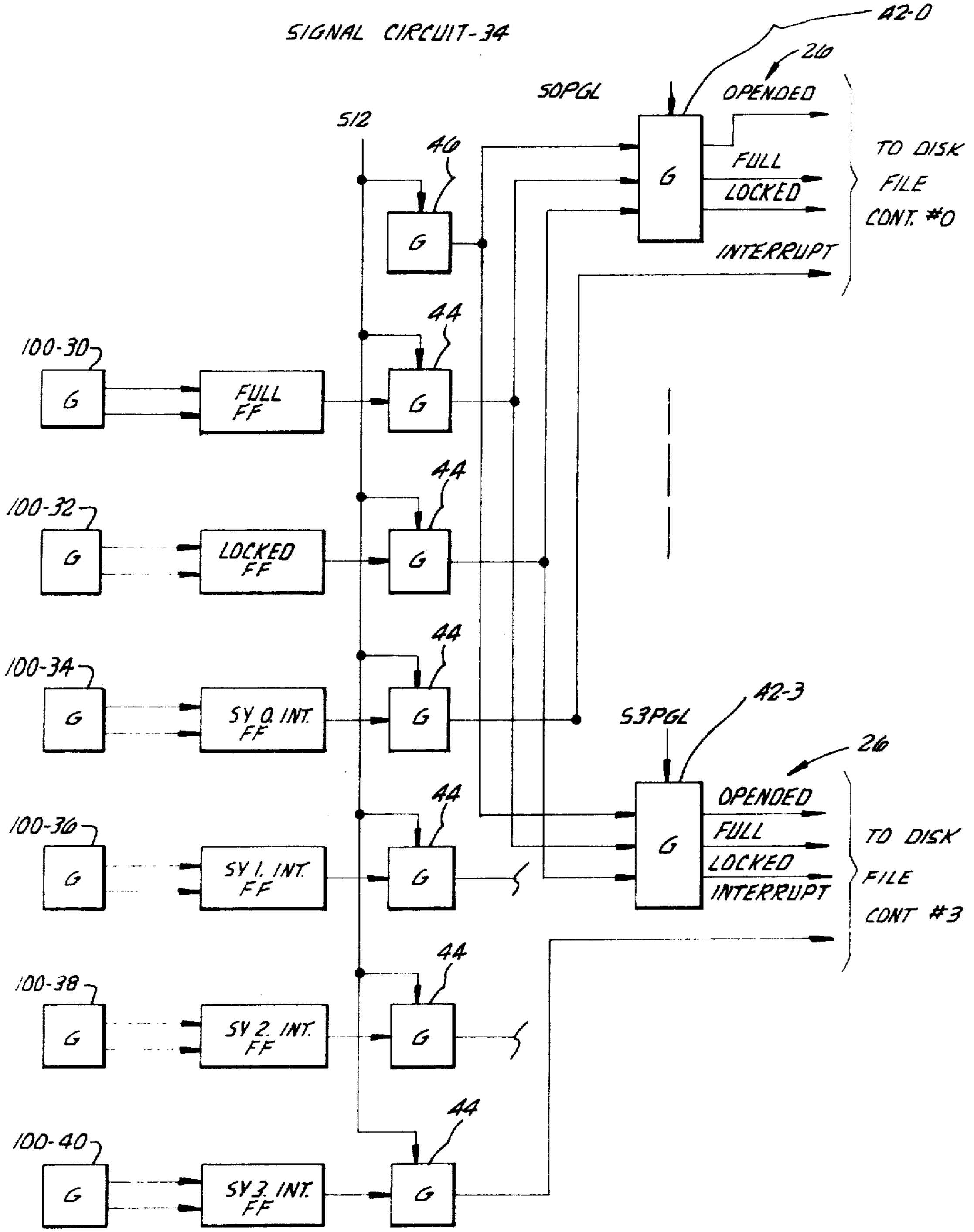
FIG. 5 is a block diagram of the signal circuit used in the communication control memory of FIG. 2.

FIG. 5 is a block diagram showing the details of the signal circuit 34. The signal circuit 34 has six flip-flops which are used for providing signals back to the disc file controls 16. The six flip-flops are called the FULL flip-flop (FULL FF), the locked flip-flop (LOCKED FF), the system 0 interrupt flip-flop (SY0.INT.FF.) through system 3 interrupt flip-flop (SY3.INT.FF.). The FULL FF is used to signal the disc file controls that the memory is full. The LOCKED FF is used to signal the disc file controls that the address which it is attempting to access is locked or in use. The outputs of the FULL FF and LOCKED FF are coupled through gates 42-0 through 42-3 to the disc file controls No. 0 through No. 3, respectively. The SY0.INT.FF. through SY3.INT.FF. are used to provide a signal to the corresponding disc file control 16 that the communication control memory 20 has completed an operation during which a previously locked and contended for address (by this system) has been unlocked. A gate 44 is coupled to the output of each of the six flip-flops. The gates 44 couple the FULL FF and LOCKED FF to the gates 42-0 through 42-3. Gates 44 also couple the SY0.INT.FF through SY3.INT.FF to the corresponding disc file controls. A gate 46 causes a control signal to be applied at the OP.ENDED output of the gates 42-0 through 42-3 which is activated. The gate 44 and the gate 46 are activated in response to a control signal at the S12 output from the control unit 24.

The various gating circuits in the communication control memory of FIG. 2 are represented by the symbols 100 followed by a numeral. A gate 100-2 is connected to the operator and address control lines 22 from each of the disc file controls 16. The gate 100-2 is responsive to a control signal at the S1 output of the control unit 24 for storing the operator appearing on one of the set of lines 22 into the operator register 23. The particular set of operator and address transfer lines 19 from which an operator is stored is determined by the particular output of the priority resolution circuit receiving a control signal. A control signal at the S0PGL output causes the gate 100-2 to store an operator from the disc file control No. 0 into the operator register, whereas a control signal at the S3PGL output causes the gate 100-2 to store an operator from the disc file control No. 3.

Gate 100-4 gates the characters of an address between the address register 26 and the disc file controls 16. The particular disc file control 16 into which, or from which, address characters are to be gated by the gate 100-4 is determined by the priority resolution circuit 22. Thus, a control signal at the S0PGL output causes the gate 100-4 to gate address characters between the disc file control No. 0 and the address register 26. The particular character stored into the address register 26 or gated out of the address register 26 to one of the disc file controls 16 is determined by the control signals at the S output of the control unit 24. Control signals at the output circuits S2 through S5 strobe the characters 1 through 4, respectively, of an address from the disc file controls 16 into sections CH1 through CH4, respectively, of the address register 26. Control signals at the S8 through S11 outputs strobe the characters 1 through 4 of the address from the section CH1 through CH4, respectively, of the address register 26 to one of the disc file controls 16.

In order to simplify the drawings and provide a clearer understanding of the operation of the system shown in FIG. 2, the structure of various gating circuits in the communication control memory 20 of FIG. 2 are shown herein by way of Boolean equations. The Boolean equations for the indicated gates are shown in Table III.

The notation used in the Boolean equations should be noted. For example, the output of the clock pulse generator 36 is represented by the symbol CCP. The output of the control unit 24 is represented by the letter "S" followed by the number corres-ponding to the particular output. A decoder 23a decodes the three operators stored in the operator register 23 and applies a control signal at one of four outputs (not shown) represented by the symbols OP5 for LOCK ADDRESS operator, OP6 for UNLOCK I operator, and OP14 for UNLOCK II operator. The output circuits OP5, OP6 and OP14 are used in the logical equations. Additionally, the decoder 23*a* has an output referenced by the symbol $\overline{\text{OP14}}$ (not shown) at which a control signal is normally applied when the OP. register 23 is storing either an OP5 or an OP6.

Each of the outputs from the memory 30 has a circuit which receives a control signal whenever a 1 is read out from the corresponding storage cell and a circuit which receives a control signal whenever a 0 is read out of the corresponding cell. The CONT.CH. output of the memory 30 have these two circuits represented by the symbols C1, C1' through C8 and C8' (see FIG. 3). Thus, a control signal is applied at the C1 output whenever the lock bit is a 1 and the C1' whenever the lock bit is a 0. Similarly, a control signal is applied at the C8 output whenever the C8 bit is a 1, indicating that disc file control No. 0 is contending for the associated address and has a control signal at the C8' output whenever the C8 bit is a 0, indicating that disc file control No. 0 is not contending for the associated address. FIG. 3 shows the outputs C1 and C1', and C8 and C8' by way of example, the outputs for C2 through C7 not being shown for simplicity. The outputs C1, C1' through C8, C8' are used in various equations in Table III.

The CL.REG. and the CONT.REG. in the temporary storage registers 38 each have a flip-flop which indicates whether the corresponding register is full (contaIns information) or is empty (does not contain information). The CL.REG. and CONT.REG. have outputs referenced by the symbols CL.R.E. and CONT.R.E. at which control signals are applied when the corresponding register is empty. The CL.REG. and CONT.REG. also have outputs referenced by the symbols $\overline{\text{CL.R.E.}}$ and $\overline{\text{CONT.R.E.}}$, respectively, (not shown in FIG. 2), at which control signals are applied when the corresponding registers are not empty.

The system of notation for the flip-flops should also be noted. A flip-flop is represented by symbols corresponding to the particular flip-flop followed by the letters "FF," (i.e. STOP+1 FF, FULL FF). The outputs of the flip-flops are represented by the same symbols, except that one F is dropped. The output receiving a signal when a corresponding flip-flop stores a 1 is unprimed (i.e. STOP+1F and FULL F), whereas the output receiving a control signal when the flip-flop is stored a 0 is represented by a line over the top (i.e.

$\overline{STOP+1F}$ and $\overline{FULL\ F}$). Two terms are used in a number of different places in the equations and are abbreviated. For example, the term CFBTS standing for "Contended For By This System" is represented by the equations at the end of Table II.

The gating condition shown opposite STOP+1 ← 1 is used in a number of different equations in Table II and is represented by the symbol STOP+1 ← 1 for simplicity.

DETAILED DESCRIPTION OF THE OPERATION

Consider now an example of the operation of the communication control memory 20 shown in FIG. 2 making reference to the flow diagram shown in FIGS. 6 through 11. The output of the control unit 24 at which a control signal is applied represents the "state" of the control unit. The flow diagrams use "set" to refer to setting a flip-flop to a 1 state and "reset" to refer to resetting a flip-flop to a 0 state.

Initially, the control unit 24 applies a control signal at the S0 output and is in a wait or idle state S0. Nothing of significance takes place in the communication control memory 20 during state S0. Assume now that the disc file control No. 0 applies a control signal to the request line 24. The priority resolution circuit 22, if available, is responsive to the signal for forming a control signal at the S0PGL output. The control signal at the SOPGL output causes the control unit 24 to go from state S0 to S1.

During state S1 an operator from disc file control No. 0 is stored into the operator register 23. To this end, gate 100-2 is responsive to the control signal at the S1 and S0Pgl outputs for storing the operator from disc file control No. 0 appearing on lines 19 into the operator register 23.

Assume that the operator is a LOCK ADDRESS (OP5) operator. The decoder 23a forms a control signal at the OP5 output. This causes the control unit 24 to go from state S1 to state S2 through S5, sequentially, where the four characters of the address associated with the LOCK ADDRESS operator are stored into the address register 26. During each of the states S2 through S5 the control signal S0PGL is applied to gate 100-4. The disc file control No. 0 applies the four characters of the address to the operator an address transfer lines 19 sequentially a character at a time. The control signals at S2 through S5 are timed to cause the gate 100-4 to store the four characters of the address into sections CH1 through CH4 of the address register 26.

After the four address characters are received by the communication control memory the disc file control is free to continue whatever operation it is performing.

Following state S5, the control unit 24 goes into state S6. However, before describing the operation of the system during state S6 of the control unit 24, it should be noted that, should the operator stored in the operator register 23 have been an UNLOCK II (OP14) operator, no addresses would have been sent over by the disc file control, hence the control unit 24 would have skipped from state S1 to state S6.

Continuing with the operation, the control unit 24 now remains in state S6 for a number of different operations in the communication control memory 20. The control signal at the S6 output causes the counter 32 to commence scanning the memory 30 by counting sequentially through its various states.

Figure 7:
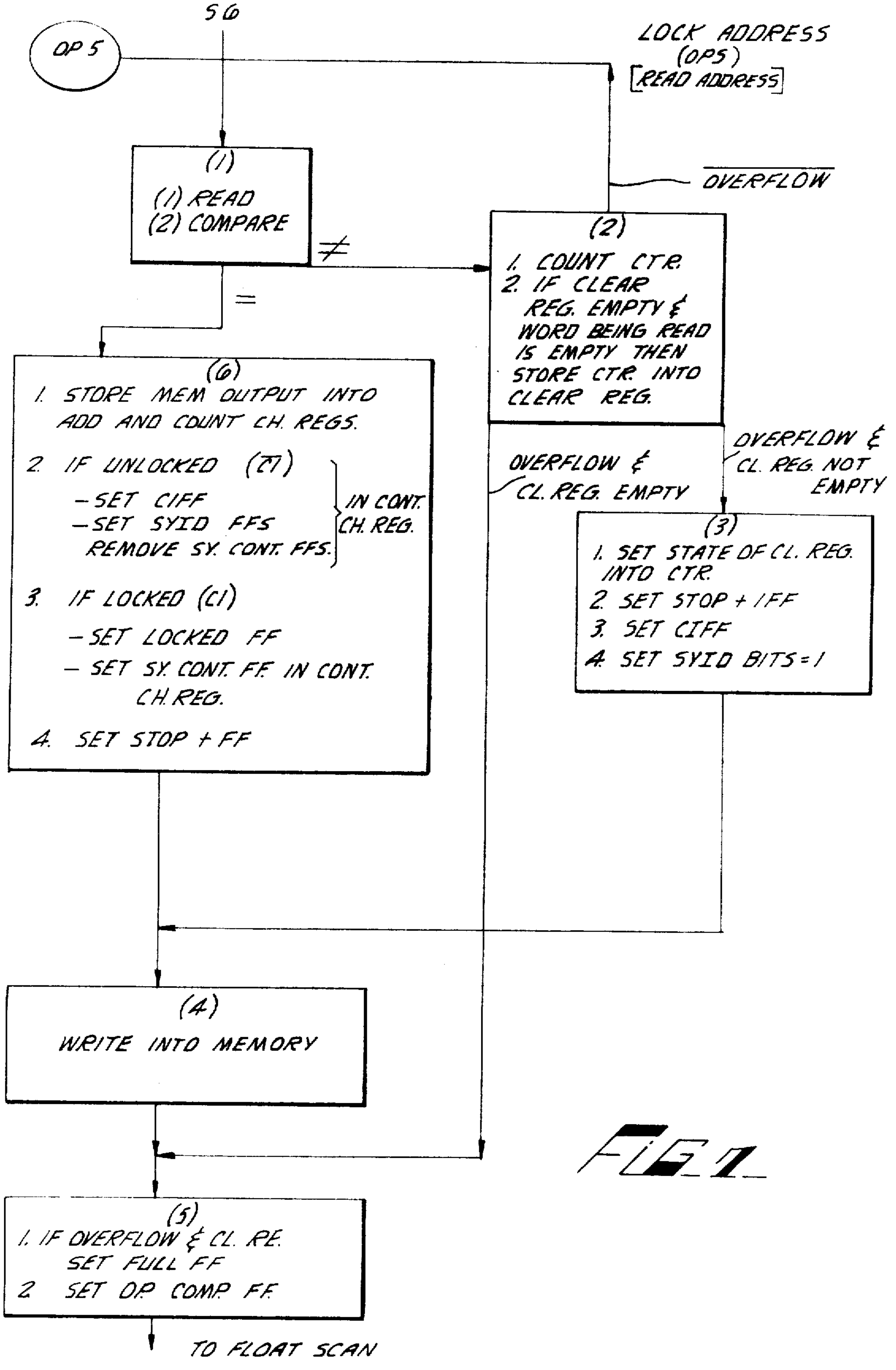
FIG. 7 is a flow diagram illustrating the sequence of operation of the communication control memory in response to a lock address operator.

Since a LOCK ADDRESS operator (OP5) is received, the flow shown in FIG. 7 illustrates the ensuing operation. During block numbered 1 in FIG. 7 the content of the storage location corresponding to the state of the counter 32 is read and applied to the ADD. and CONT.CH. outputs thereof. To this end, the read control gate 100-12 is responsive to the coincidence of a control signal at S6 and the absence of a control signal at the output of the write control gate 100-14 to apply a read control signal to the memory 30, causing a readout.

An address is contained in the address register 26 and the memory 30 is reading out the content of the storage location corresponding to the first state of the counter 32. The compare unit 40 compares the two addresses and if they are unequal, applies a control signal at the ≠ output. Referring to FIG. 7, this causes the operations indicated in block 2 to be activated wherein the counter 32 is counted and, if the CL.REG. is empty and the word being from the memory 30 is empty, the state of the counter 32 is stored into the CL.REG. Normally, during a lock address operator, the address stored in the ADD.REG. 26 is not yet contained in the memory 30. Accordingly, the normal operation is to go from block 1 to block 2.

The purpose of storing the state of the counter into the CL.REG. is to provide a temporary storage for the state of the counter 32 which corresponds to an empty memory location into which the address with its associated control character now contained in registers 26 and 28 can be stored.

Consider now the actual operation during block 2. Refer to the structure of the gate 100-10, as illustrated in Table II, for causing the counter 32 to count. The gate 100-10 causes the counter 32 to count in response to the coincidence of control signals at the following outputs: CCP, S6, $\overline{\text{OVERFLOW}}$, $\overline{\text{OP.COMP.F.}}$, OP5, and ≠ . Control signals are now formed at each of the foregoing outputs, accordingly, the counter counts from its initial state to the next state.

Assume that the storage location contained in the memory 30 corresponding to the present state of the counter 32 is empty. An empty memory location stores a control character which consists of all 0's, thereby indicating that the address stored in that location, if any, is neither in use nor contended for. The memory 30 will read out of the content of the storage location and apply signals at all of the primed outputs of the CONT.CH. output portion. Accordingly, control signals are applied at the $\overline{C1}$ through $\overline{C8}$ outputs. The CL.REG. is still empty, accordingly, at the next clock pulse control signals are formed at each of the following outputs: CCP, S6, OP5, CL.R.E., and $\overline{C1}$ through $\overline{C8}$. With reference to Table II it will be seen that this condition will cause gate 100-16 to store the state of the counter 32 into the CL.REG. and cause a control signal at the output $\overline{\text{CL.R.E.}}$ The CL.REG. now contains a designation of an empty storage location in the memory 30. Additionally, gate 110-10 causes the counter 32 to count to its next state.

The gate 100-10 causes the counter 32 to continue counting as described hereinabove until it finally counts to its last state corresponding to the last storage location in the memory 30, thereby causing a control signal at the OVERFLOW output. This condition causes the communication control memory 20 to go to block 3 where the content of the CL.REG. is set back into the counter 32, the C1FF flip-flop is set to a 1 state (to form a lock bit for the associated address) and the system identification flip-flops, SY3IDFF and SY4IDFF, are set to states 00 representing disc file control No. 0. Also, the STOP+1FF is set to a 1 state thereby initiating a memory write operation.

Consider now the gating for carrying out the operations indicated in block 3. At the following clock pulse control signals are formed at the outputs CCP, S6, OP5, ≠ , OVERFLOW, and $\overline{\text{CL.R.E.}}$ Referring to the equation for gate 100-18 (Table II) it will be seen that under these conditions the gate will store the content of the CL.REG. back into the counter 32. The signal at CL.R.E. is not removed immediately. Instead, the signal at CL.R.E. is removed and a signal is applied at the $\overline{\text{CL.R.E.}}$ output in response to the signal at S12 which occurs at the end of the operation. Referring to Table II, it will be seen that the control signals at the same output circuits cause the gates 100-25 and 100-24 to set the STOP+1FF (FIG. 4) and the C1FF to a 1 state. In addition to the control signals at the aforementioned outputs, a control signal is still formed at the S0PGL output of the priority resolution circuit 22, corresponding to disc file control No. 0. Accordingly, the gate 100-24 applies a control signal to the SYID flip-flops (SY3IDDFF and SY4IDFF) setting them both to a 0 state corresponding to disc file control No. 0. At this point the address being locked is contained in the address register 26, the C1FF flip-flop in the CONT.CH.REG. 28 is set to a 1 state, indicating that the associated address is locked and the SY3IDFF and SY4IDFF are both set to a 0 state, indicating that the disc file control No. 0 is the locking system.

Block 4 is now entered where the content of register 28 and 26 are written into the memory 30. At the following clock pulse, control signals are formed at the following outputs: CCP, S6, OP5, and STOP+1F. With reference to the equation for gate 100-14 in Table II, it will be seen that a control signal is now formed by the write control gate 100-14 causing the memory 30 to write the content of the CONT.CH.REG. 28 and the ADD.REG. 26 into the address or storage location corresponding to the state of the counter 32.

Following block 4, block 5 is entered where the OP.COMP.FF. is set to a 1 state. Referring to Table II the equation for gate 100-26, which sets the OP.COMP.FF to a 1 state has one set of the conditions the same as that which causes the gate 100-14 initiate a write into memory. Accordingly, at the same time that the write operation takes place in the memory 30, the OP.COMP.FF is set to a 1 state by the gate 100-26. Thus, although the setting of the OP.COMP.FF shows in block 5, the setting thereof occurs at the same time as the write into memory 30 takes place.

Figure 10:
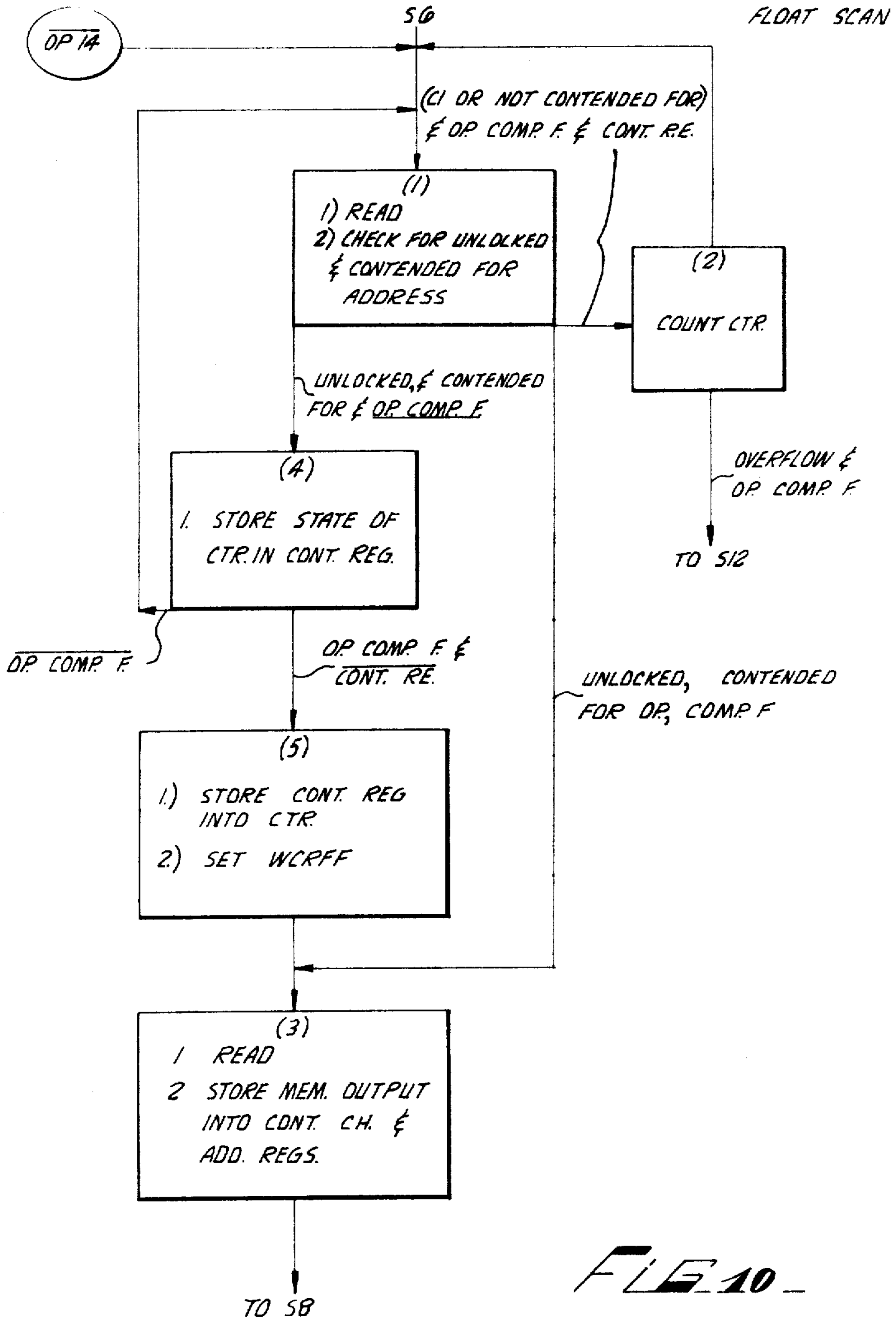
FIG. 10 is a flow diagram illustrating the float scan operation of the communication control memory.

Following block 5, the communication control memory 30 goes to the FLOAT SCAN operation shown in FIG. 10 where the memory is scanned to determine if there are any unlocked and contended for addresses contained in the memory 30. However, before describing the afloat scan operation in detail, consider the other sequences by which the communication control memory 20 finally sets the OP.COMP.FF.

Return to blocks 1 and 2. When the counter has scanned through the entire memory 30, without having found an empty storage location, the CL.REG. will be empty (CL.R.E.) and a control signal will be formed at OVERFLOW. Under these conditions block 5 will be entered directly from block 2 as the address contained in the address register 26 cannot be stored into the memory because there are no empty storage locations. Accordingly, the OP.COMP.FF (FIG. 4) and the FULL FF (FIG. 5) are set to 1 states signalling disc file control No. 0 that there is no space available in the memory 30 for storing the locked address.

During block 5 control signals are formed at the output circuits CCP, S6, OVERFLOW, CL.R.E., and OP5. Referring to Table II, it will be noted that these control signals cause the gates 100-30 to set the FULL FF to a 1 state and will cause the gate 100-26 to set the OP.COMP.FF to a 1 state.

It is also possible, under certain circumstances, although not normal, that during the read and compare operation in block 1, that an address will be read out of the memory 30 which is equal to the address contained in the ADD.REG. 26. This means that the address, for some reason, has previously been stored in the memory 30. Under these circumstances, block 6 will be entered following block 1.

Consider now this operation. During block 6 the output of the memory 30 will be stored into the registers 26 and 28. If this particular address is unlocked (i.e. $\overline{\text{C1}}$) then the C1FF flip-flop in the CONT.CH.REG. 28 will be set to a 1 state, the SYIDFFs will be set corresponding to disc file control No. 0 (the locking system) and the syllable contention flip-flop for disc file control No. 0 will be removed or set to a 0 state if previously in a 1 state. If the address read from memory is locked (C1) then the LOCKED flip-flop (FIG. 5) is set to a 1 state indicating back to the disc file control No. 0 that the address is already in use and SY8IDFF is set to a 1 state indicating that disc file control No. 0 has contended for the associated address unsuccessfully.

Consider now the detail operation during block 6. During block 6 control signals are formed at the following outputs: CCP, S6, OP5, $\overline{\text{OVERFLOW}}$ and =.

Assume first that the address being read is locked (C1). Gate 100-6 (see Table II) stores the output of the memory 30 into the CONT.CH.REG. 28 and the ADD.REG. 26. Additionally control signals are formed at the C1 and SOPGL outputs. Therefore gate 100-24 sets the SY8CBFF flip-flop to a 1 state indicating disc file control No. 0 is contending for the address.

It should be noted that during block 6 the system contention flip-flops are removed. This means that if the contention bit for the disc file control which is locking the address is a 1 bit, that contention bit is to be changed to a 0 bit by appropriately setting the corresponding flip-flop in the control character register. This is actually done at the same time that the control character read from memory is stored into the control character register. To this end, the gate 100-24 resets the appropriate contention flip-flop to a 0 state if the corresponding contention bit being read from memory is a 1 bit. To this end, Table II shows the gating equations for gate 100-24 for resetting SY5CBFF through SY8CBFF and these gating equations override or prevent gate 100-6 from storing the corresponding control character bit into the SYCBFF which is being reset.

Assume the C8 bit in the control character being read from memory is a 1 bit. Thus, in the example being given control signals are formed at the CCP, OP5, $\overline{C1}$, SOPGL, STOP+1←1 and C8 outputs and hence SY8CBFF is reset to a 0 state thereby removing the system contention bit.

Assume that the address being read out of the memory 30 is unlocked (C1) rather than locked. Gate 100-24 (Table II) sets C1FF to a 1 state.

Control signals at the aforementioned outputs also cause the gate 100-25 to set the STOP+1FF to a 1 state.

Following block 6, blocks 4 and 5 will be entered where the address with the newly formed control character will be written from registers 26 and 28 into the memory 30, back into the same memory location from which the address was originally read. The operations during blocks 4 and 5 can be followed making reference to the logical operations in Table II and the foregoing description with respect thereto.

Consider the FLOAT SCAN operation illustrated in the flow diagram of FIG. 10. Following block 5 the communication control 20 enters the FLOAT SCAN operation. As indicated in block 1 (FIG. 10) the FLOAT SCAN operation will be entered whenever the operator contained in the operator register 23 is not OP14. Actually blocks 1 and 4 in the FLOAT SCAN flow of FIG. 10 overlap with the operation occurring in the LOCK ADDRESS flow of FIG. 7. The overlap occurs in that during the execution of the LOCK ADDRESS operator the FLOAT SCAN operation takes place to the extent that a check is made for any unlocked and contended for addresses as the counter scans through the various storage locations in the memory. If a storage location is scanned which contains an address, that is contended for but unlocked, then block 4 in the FLOAT SCAN is entered where the state of the counter 32 corresponding to such storage location is stored in the CONT.REG. In this manner the state of the counter corresponding to a contended for and unlocked address is stored in the contention register for later use in picking up such address and the corresponding control character for use in signalling the corresponding disc file control that the address is now available.

There may be a number of different addresses which are no longer locked but are being contended for. Accordingly, one out of all the unlocked and contended for addresses must be selected during a scan of memory. To this end, a unique procedure is used which tends to select the oldest address stored in memory first. To this end, the communication control memory 20 is arranged so that each time a different unlocked and contended for address is detected in the memory 30, the corresponding state of the counter 32 is stored into the CONT.REG., overwriting any previous state of the counter contained therein. As a result, the addresses stored near the end of the memory 30 will be picked up and handled prior to addresses near the beginning of the memory.

Consider now the operation. Assume that an unlock and contended for address is encountered in the memory 30 during the scan of the counter 32. Also assume that the disc file control which is contending for the address (as indicated in the associated control character) is in the disc file control which is presently communicating with the communication control memory 20. Stating it differently, the address is "Contended For By This System" meaning the disc file control presently communicating with the communication control memory 20. Also assume that the OP.COMP.FF. has not yet been set as described hereinabove for the LOCK ADDRESS operation.

Control signals are presently being formed at the output circuits CCP, S6, $\overline{OP14}$, $\overline{C1}$, (indicating the address is unlocked), SOPGL, C8 and $\overline{OP.COMP.F}$. Accordingly, the gate 100-16 (see Table II) stores the state of the counter 32 into the CONT.REG. This operation continues for each state of the counter 32 for which an address is read from the memory 30 in which the control character indicates that the corresponding address is unlocked and contended for by disc file control No. 0.

Assume that the OP.COMP.FF. is set to a 1 state indicating that the execution of OP5, or OP6 (not OP14), is complete and that the CONT.REG. is not empty. Block 5 in the FLOAT SCAN will be entered where the content of the CONT.REG. will be stored back into the counter 32 and the WCRFF flip-flop will be set to a 1 state. To this end, control signals are formed at the output circuits CCP, S6, OP.COMP.F., $\overline{CONT.R.E.}$ AND $\overline{OP14}$. With reference to the logic for gate 100-18 (Table II), it will be noted this will cause the gate 100-18 to store the content of the CONT.REG. back into the counter 32 and set a control signal at the CONT.R.E. output. The same conditions cause the gate 100-28 to set the WCRFF flip-flop to a 1 state.

Following block 5, block 3 in the FLOAT SCAN operation is entered where the content of the storage location corresponding to the new state of the counter 32 is read out, stored in the ADD.REG. 26 and CONT.REG. 28, preliminary to signaling the disc file control that an address previously contended for by such disc file control is now available for accessing. The memory 30 automatically reads out the content of the storage location corresponding to the counter 32. Control signals are formed at the output circuits CCP, S6, $\overline{C1}$, SOPGL, C8 (see CFBTS) OP.COMP.F., and WCRF. These conditions cause the gate 100-6 (Table II) to store the output of the memory 30 into the registers 26 and 28.

Figure 11:
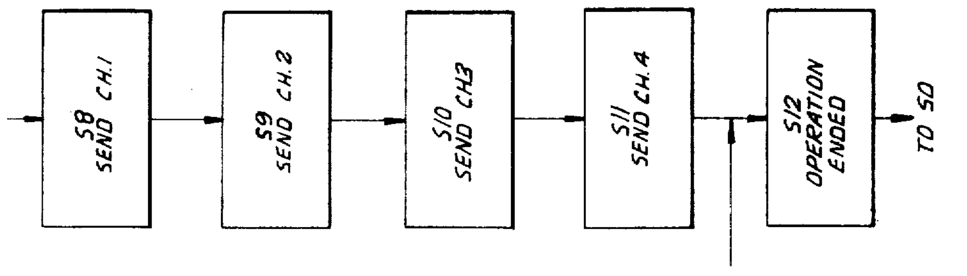
FIG. 11 is a flow diagram illustrating the terminal operation of the communication control memory following each operator.

Following block 3 of the FLOAT SCAN operation, the flow shown on FIG. 11 will be entered. Specifically, the control unit 24 will go into states S8 through S12 where the address contained in the ADD.REG. 26 will be sent back to the originating disc file control and the operation of the communication control memory 20 will be ended.

However, before considering the terminal flow, consider the other possible operations during the FLOAT SCAN operation of FIG. 10. One possibility is that the OP.COMP.FF. may be in a 1 state at the time that an unlocked and contended for address is scanned by the counter 32. Under these conditions, the block 3 will be entered directly from block 1 where the output of the memory 30 will be stored into the registers 26 and 28 as described hereinabove and, consequently, state S8 of the control unit 24 will be entered in the terminal flow of FIG. 11.

Another possible condition during block 1 is that the OP.COMP.FF. may be set into a 1 state indicating the end of execution of an operator at a time when the CONT.REG. is empty (CONT.R.E.) and a word is being read out of the memory 30 which is either not contended for by the disc file control presently communicating with the communication control memory, or the address is locked. Under these conditions block 2 will be entered and control signals will be formed at the output circuits CCP, S6, $\overline{\text{OVERFLOW}}$, $\overline{\text{OP14}}$, OP.COMP.F., C1, $\overline{\text{CFBTS}}$ AND CONT.R.E. These conditions cause the counter 32 to continue the scan of the memory 30. Gate 100-10 causes the counter 32 to continue scanning or counting until either an unlocked and contended for by disc file control No. 0 address is encountered in the memory 30, or until the counter 32 overflows. The first condition has already been described. Assume that the counter 32 overflows causing a control signal at the OVERFLOW output. Control signals at the OVERFLOW output together with control signals at CCP, S6, OVERFLOW and OP.COMP.F. cause the gate 100-22 to set the control unit 24 to state S12 where the operation of the communication control memory 20 is ended. (See S12 in FIG. 11).

Consider now the terminal operation illustrated in the flow of FIG. 11. Assume a condition where the terminal flow of FIG. 11 is entered from block 3 of the FLOAT SCAN operation shown in FIG. 10. Under these conditions, state S8 of the control unit 24 will be entered followed by states S9, S10 and S11 where the address characters contained in the address register 26 will be sent back to the appropriate disc file control. At this point, control signals are formed at the output circuits CCP, S6, OP.COMP.F. and, either $\overline{\text{OP14}}$, $\overline{\text{C1}}$, SOPGL and C8 (see CFBTS), or WCRF. These conditions cause the gate 100-20 (Table II) to set the control unit 24 into state S8. Following state 8, the control unit 24 automatically counts sequentially through states S9, S10, S11 and S12, causing the gate 100-4 to sequentially gate the characters from the address register 26 to the address lines 22 to disc file control No. 0.

The control signal at S12 causes the gate 44 (FIG. 5) to gate the output of the corresponding flip-flops to the gates 42-0 through 42-3. The control signal at S12 causes the gate 46 to apply a control signal to the gates 42-0 through 42-3, indicating that the operation is now ended (OP.ENDED). Since disc file control No. 0 is the one that is communicating with the communication control memory 20 the priority resolution circuit 22 is still applying a control signal at the SOPGL output. This causes gate 42-0 to couple the output of gates 46 and 44 through to the output circuits OP.ENDED, FULL and LOCKED to disc file control NO. 0. In this manner, signals are sent back to the initiating disc file control indicating that the operation which it initially requested is now completed and indication whether the address which it contended for is locked and whether the memory is full.

The control signal at the S12 output also causes all flip-flops, counters and registers to be reset or cleared to a 0 condition. Additionally, the control signal at S12 causes the control unit 24 to be rest to a WAIT or SO state.

The control signal at S12 also causes the priority resolution circuit to remove the control signal from the output at which it is currently applying a control signal to, and causes the output corresponding to the next disc file control in order of time, to receive a control signal as described hereinabove. It will now be evident that the various gates which respond to the C5 through C8 bits form means for inspecting such bits or indicia and, in association with the flip-flops in the signal circuit 34, form means for providing an indication to the disc file controls of that an address which is contended for is no longer locked.

The purpose of the UNLOCK I operator is to determine if the associated address is stored in the memory 30 and is indicated to be locked and, if so, to place the state of the counter 32 corresponding to the storage location for such address into the system unlock register which corresponds to the disc file control now communicating with the communication control memory 20. Thus, the storage location is to be stored in SY3 UNL. REG. as disc file control No. 3 is now communicating with the communication control memory. To be explained in more detail, an UNLOCK II operator is subsequently sent over by the same disc file control which sent the UNLOCK I operator and causes the UNLOCK operation for the address to be completed.

Assume now, for purposes of explanation, that disc file control No. 3 is the next one for which priority is granted by the priority resolution circuit 22 and, therefore, a control signal is formed at the S3PGL output. Gate 100-2 will store the operator appearing on the operator lines 22 from disc file control No. 3 into the operator register 23 as described hereinabove. Assume that the stored operator is an UNLOCK I operator (OP6). Referring to the flow in FIG. 6, an UNLOCK I operator has an associated address. Accordingly, states S2 through S5 are entered where the four characters of the address are stored by gate 100-4, one at a time, from the lines 22 into the address register 26 as described hereinabove. Following state S5, state S6 is entered where the memory read and scan operations are again initiated.

Figure 8:
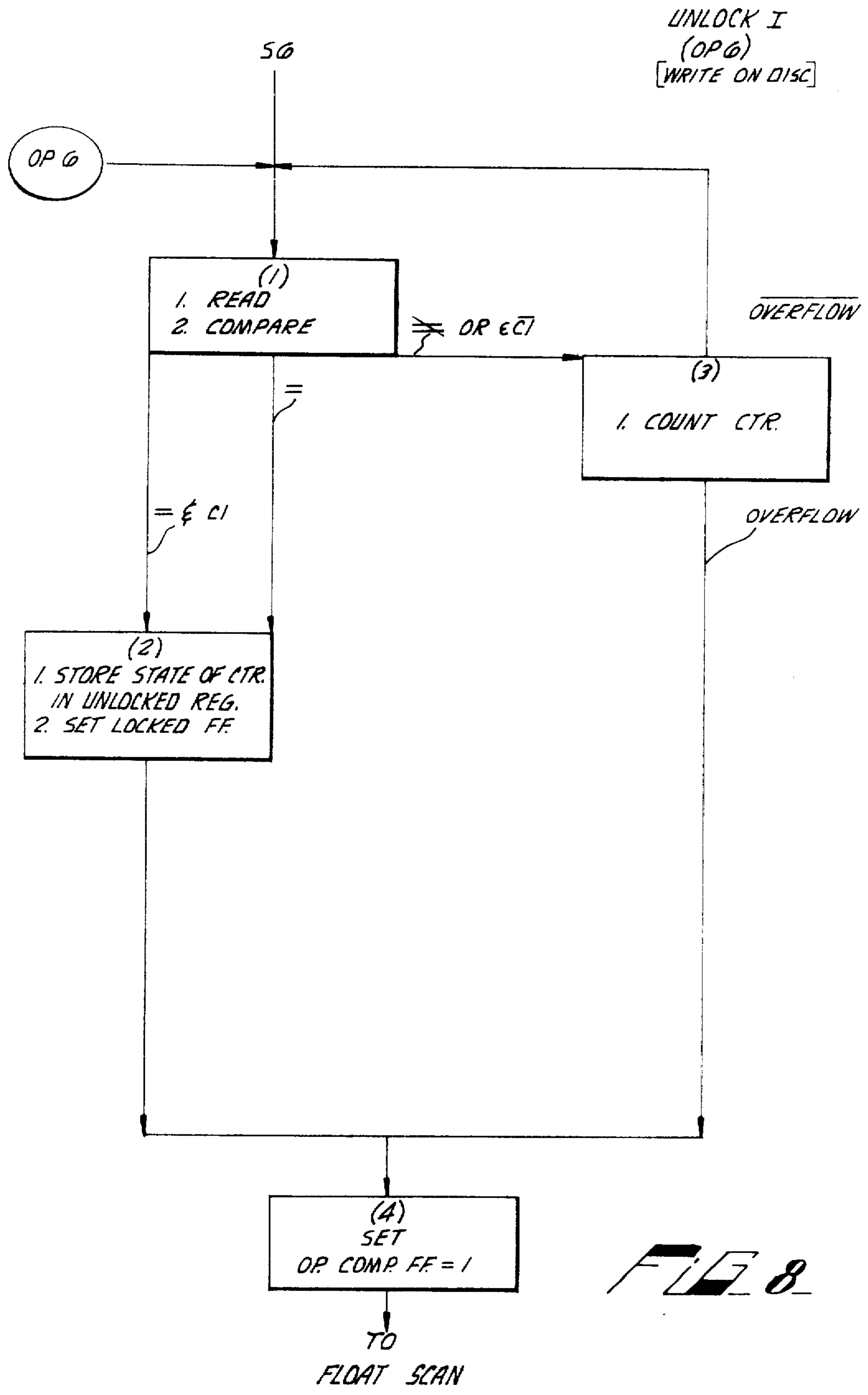
FIG. 8 is a flow diagram illustrating the operation of the communication control memory in response to an unlock I operator.

Refer now to FIg. 8 which illustrates the operation during an UNLOCK I operator. First, block 1 is entered where the memory 30 is read in response to a control signal from the read control gate 100-12 as described above. The compare register 40 compares the address read out of the memory 30 with the address contained in the ADD.REG. 26. If equality is not detected, a control signal is formed at the ≠ output causing block 3 to be entered.

During block 3, the counter 32 is counted and then block 1 is re-entered where the storage location corresponding to the new state is compared with the content of the address register 26. To this end, control signals are formed at the CCP, S6, $\overline{\text{OVERFLOW}}$, $\overline{\text{OP.COMP.F.}}$, OP6, and ≠ outputs. These conditions cause gate 100-10 to count the counter 32. The count and compare operations continue until either an overflow occurs, or the compare unit 40 detects an address read out of the memory 30 which is equal to that stored in the ADD.REG.26.

Assume that the compare unit 40 detects an equality and forms a control signal at the = output. Also, assume that the control character associated with the address being read from memory is locked. This will cause block 2 of the UNLOCK I operator flow to be entered.

During block 2 of the UNLOCK I operator flow, the state of the counter 32 is stored into the unlock register corresponding to the particular disc file control which is communicating with the communication control memory 20. In the particular example being given it is disc file control No. 3 and therefore SY3 UNL.REG. will be used to store the state of the counter. Also during block 2 the LOCKED FF will be set to a 1 state enabling the signal circuit 34 to signal the disc file control No. 3 that the address is presently locked as it normally should be. At this point control signals are formed at the CCP, S6, OP6, = , C1, and S3PGL outputs. Therefore, gate 100-16 stores the state of the counter 32 into the SY3 UNL.REG. These very same control signals, with the exception of the control signal at S3PGL, cause the gate 100-32 to set the LOCKED FF to a 1 state.

Following block 2 of the UNLOCK I operation, block 4 is entered where the OP.COMP.FF. is set to a 1 state. When any one of the syllable unlock registers is stored with information, a control signal is set at the SY.UNL.REG.SET output from the temporary storage register 38. Additionally, control signals are formed at the CCP, S6 and OP6 outputs. These control signals cause the gate 100-26 to set the OP.COMP.FF to a 1 state.

With the OP.COMP.FF set to a 1 state, the FLOAT SCAN operation shown in FIG. 10 is again entered where the memory is scanned for an unlocked address which is contended for by the disc file control currently communicating with the communication control memory 20. Following the FLOAT SCAN operation, the terminal flow shown in FIG. 11 is again entered and finally the control unit 24 enters state S12 where the operation is ended. The operation during states S8 through S12 can be followed with reference to the logical equations, the flow diagram of FIG. 11, and the preceding description for these states. However, it should be noted that during state S12 the gate 44 (see FIG. 5) gates the output of the LOCKED FF through to gate 42-3 which corresponds to the disc file control No. 3. In this manner when the OP.ENDED signal is sent to the disc file control No. 3, a control signal is also applied on the LOCKED line indicating to disc file control No. 3 that an address has been found which is properly locked.

Referring back to the UNLOCK I flow of FIG. 8, it should be noted that two possible error conditions may exist. One possible error condition is that the compare unit 40 will detect an address in the memory 30 equal to the address stored in the address register 26, but which has associated therewith a control character that indicates that the address is not locked. This is an error condition and will cause the UNLOCK I flow to go from block 1 to block 4 where the OP.COMP.FF is set to a 1 state without setting the LOCKED FF to a 1 state. This same thing may occur if the counter scans through the entire memory to form a control signal at the OVERFLOW output without detecting an address in the memory equal to that stored in the ADD.REG.26. Under these latter conditions the communication control memory 20 will go from block 3 to block 4 in the flow shown in FIG. 8. Under either of these error conditions the LOCKED FF will remain in a 0 state, accordingly, when state S12 is entered and the gate 42-3 gates the signals from the LOCKED FF to the disc file control No. 3 no signal will appear on the LOCKED line thereby indicating an error condition.

The disc file control simultaneously accesses the desired address in the disc file as it sends an UNLOCK I operator to the communication control memory 20. The information gated back to the disc file control on the signal lines 26 indicate to the disc file control whether the information which is written is in use or not in use. After the disc file control has successfully written the desired information from the disc file control and has received a signal on the signal lines 21, indicating that the information is in use, the disc file control automatically sends an instruction back to the memory which, when decoded, is an UNLOCK II operator (OP14).

Assume that the disc file control No. 3 now applies an UNLOCK II operator signal on the operator and address transfer lines 19 and applies a request signal on the request line 124 to the priority resolution circuit 22. During the UNLOCK II operation, the state of the counter 32 is set to the state of the unlock register corresponding to the initiating disc file control. The corresponding storage location in the memory 30 is then read out along with the associated control character. It will be recalled that the address and associated control character are the ones that were stored in the memory 30 in response to the UNLOCK I operator. The primary purpose of the UNLOCK II operator is to now actually unlock the address. In other words, the LOCK bit (C1) in the associated control character is actually set to a 0 condition. To this end, the address and associated control character are read from the memory 30 and stored in the registers 26 and 28 and the C1FF flip-flop in the CONT.CH.REG. 28 is set to a 0 state. Following this operation the address and the control character contained in the registers 26 and 28 are stored back into the same location in memory from which they were initially read and the OP.COMP.FF is set to a 1 state indicating that the UNLOCK II operation is complete.

Figure 9:
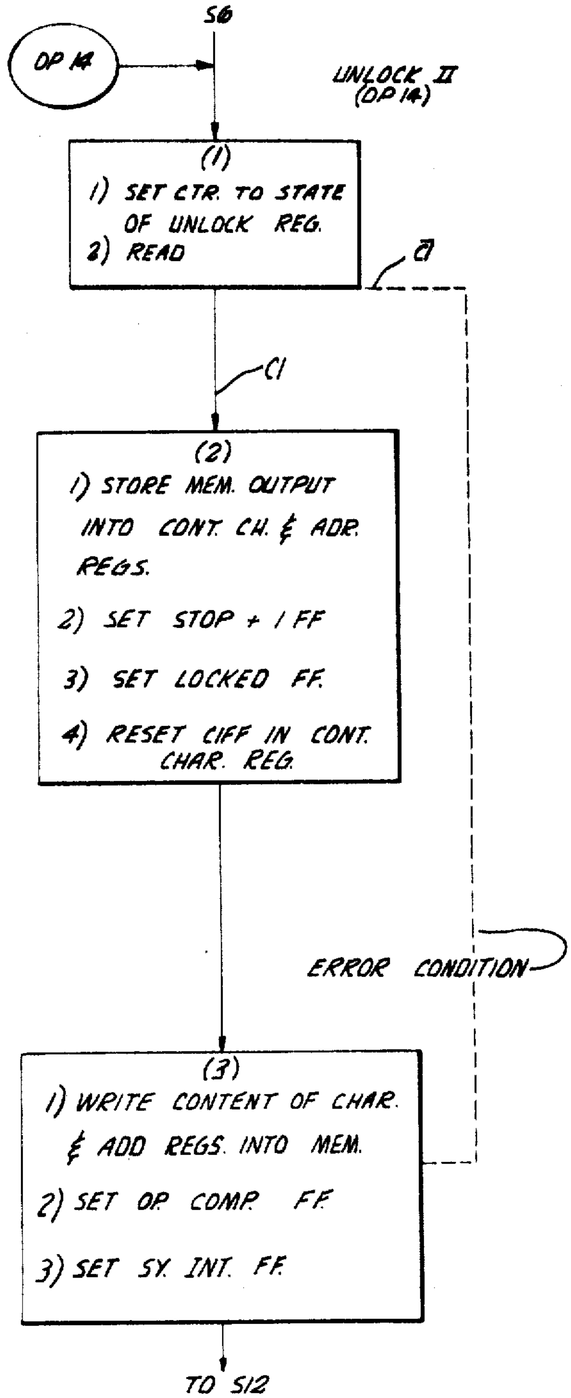
FIG. 9 is a flow diagram illustrating the sequence of operation of the communication control memory in response to an unlock II operator.

Consider the operation in detail with reference to the flow diagram of FIG. 9. During block 1 the state of the counter 32 is set to that of the SY3 UNL.REG. and the memory 30 is read. Control signals are being formed at the CCP, S6, OP14, S3PGL. These conditions cause the gate 100-18 to store the content of the SY3 UNL.REG. into the counter 32.

Following block 1, block 2 is normally entered where the output of the memory 30 is stored into the registers 28 and 26 and the C1FF flip-flop is reset to a 0 state, thereby unlocking the associated address. At this point, control signals are formed at the outputs CCP, S6, OP14 and C1. This causes the gate 100-6 (Table II) to store the output of the memory 30 into the registers 26 and 28, causes the gate 100-25 to set the STOP+1FF to a 1 state, causes the gate 100-32 to set the LOCKED FF to a 1 state, and causes the gate 100-24 to reset the C1FF flip-flop in the control character register to a 0 state.

Following block 2, block 3 of the UNLOCK II flow is entered. During block 3 of the UNLOCK II operator flow the content of the ADD.REG. and CONT.CH.REG. are written back into the same memory location in memory from which they were read and the OP.COMP.FF is set to a 1 state indicating that the UNLOCK II operator has been executed and the SYINTFFs are set. To this end, control signals are formed at the CCP, S6, OP14, C1 and STOP+1F outputs. These control signals cause the gate 100-14 to apply a control signal to the memory 30 causing the content of the registers 26 and 30 to be stored back into the same memory location as that from which they are originally read with the control character modified to indicate that the associated address is no longer locked. These same signals cause the gate 100-26 to set the OP.COMP.FF to a 1 state. The SYINTFFs for the disc file controls corresponding to the SYIDFFs which are in a 1 state are set to a 1 state. In this manner the SYINTFFs which correspond to the "1" contention bits read from memory in the control character are set to a 1 state. At this time control signals are formed at the outputs CCP, S6, OP14 and STOP+1F. Referring to gates 100-34 through 100-40, SYO INT.FF through SY3 INT.FF are set to a 1 state if the corresponding flip-flops SY8IDFF through SY5IDFF are in a 1 state.

Following block 3 of the UNLOCK II flow, state S12 of the terminal flow (FIG. 11) is entered. At this point, control signals are formed at the output circuits CCP, S6, OP14 and OP.COMP.F. This causes the gate 100-22 to set the control unit 24 into state S12 directly. Again, during state S12, the signal circuit 34 gates out the signal from the LOCKED FF, the OP.ENDED signal from the gate 46 and the SYINTFFS thereby signaling the disc file No. 3 that the UNLOCK II operation is fully completed.

By way of example, the address storage locations in the disc files could be replaced by objects such as printers or data communication channels and the addresses replaced by unique designations or indications of the objects. Designations or indications are used generically herein to include addresses.

Although one example of the present invention has been shown by way of illustration, it should be understood that there are many other rearrangements and embodiments of the present invention within the scope of the following claims.

TABLE I

| SYID C3 | BITS C4 | Disk file control system 16 |
|---|---|---|
| 0 | 0 | No. 0 |
| 0 | 1 | No. 1 |
| 1 | 0 | No. 2 |
| 1 | 1 | No. 3 |

TABLE II

| Gates | Equations for gates |
|---|---|
| 100-6 | CCP · S6 (OP5 · STOP+1 ← 1 · = + OP14 · C1 STOP+1 ← 1 + $\overline{\text{C1}}$ · CFBTS · OP.COMP.F. · WCRF) |
| 100-10 | CCP · S6 · $\overline{\text{OVERFLOW}}$ · [$\overline{\text{OP.COMP.F.}}$ · (OP5 · ≠ + OP6 · $\overline{\text{C1}}$ + OP6 · ≠ ) + $\overline{\text{OP14}}$ · OP.COMP.F. · (CL + $\overline{\text{CFBTS}}$) · CONT.R.E. + · STOP+1F] |
| 100-14 | CCP · S6 · [OP5 · STOP+1F + OP5 · OVERFLOW · $\overline{\text{CL.R.E.}}$ · STOP+1F + OP14 · C1 · STOP+1F] |
| 100-16 | STORE INTO CL.REG. and SET $\overline{\text{CL.R.E.}}$ CCP · S6 · OP5 · CL.R.E. · $\overline{\text{C1}}$ · – $\overline{\text{C8}}$<br>STORE INTO CONT.REG. and SET $\overline{\text{CONT.REG.}}$ CCP · S6 · $\overline{\text{OP14}}$ · $\overline{\text{C1}}$ · CFBTS · OP.$\overline{\text{COMP.F.}}$<br>STORE INTO SYO.UNL.REG. CCP · S6 · OP6 · = · C1 · SOPGL<br>STORE INTO SY1.UNL.REG. CCP · S6 · OP6 · = · C1 · S1PGL<br>STORE INTO SY2.UNL.REG. CCP · S6 · OP6 · = · C1 · S2PGL<br>STORE INTO SY3. UNL.REG. CCP · S6 · OP6 · = · C1 · S3PGL |
| 100-18 | STORE CL.REG. INTO CTR-32 & CCP · S6 · OP5 · ≠ · OVERFLOW · $\overline{\text{CL.R.E.}}$<br>STORE CONT.REG. INTO CTR-32 & CCP · S6 · OP.COMP.F. · $\overline{\text{CONT.R.E.}}$ · $\overline{\text{OP14}}$<br>STORE SY0.UNL.REG. INTO CTR-32 CCP . S6 · OP14 . SOPGL · STOP+1 ← 1<br>STORE SY1.UNL.REG. INTO CTR-32 CCP . S6 . OP14 · S1PGL. · STOP+1 ← 1<br>STORE SY2.UNL.REG. INTO CTR-32 CCP · S6 · OP14 · S2PGL · STOP+1 ← 1<br>STORE SY3.UNL.REG. INTO CTR-32 CCP · S 6 · OP14 · S3PGL · STOP+1 ← 1 |
| 100-20 | CCP · S6 ($\overline{\text{OP14}}$ · $\overline{\text{C1}}$ · CFBTS . OP.COMP.F. + OP.COMP.F. · WCRF) |
| 100-22 | CCP · S6 (OP14 · OP.COMP.F. + OVERFLOW · OP.COMP.F.) |
| 100-24 | SET C1FF STOP+1 ← 1 (OP5 · $\overline{\text{OVERFLOW}}$ · = + OP5 · OVERFLOW · CL.R.E.) |
| 100-24 | RESET C1FF CCP · S6 · OP14 · STOP+1 1<br>SET SY3IDFF and SY4IDFF to 00 CCP · STOP+1 ← 1 · OP5 ($\overline{\text{C1}}$ · $\overline{\text{OVERFLOW}}$ + OVERFLOW · CL.R.E.).S0PGL<br>SET SY3IDFF and SY4IDFF to 01 CCP · STOP+1 ← 1 · OP5 ($\overline{\text{C1}}$ . $\overline{\text{OVERFLOW}}$ + OVERFLOW · $\overline{\text{CL.R.E.}}$) · S1PGL<br>SET SY3IDFF and Sy4IDFF to 10 CCP · STOP+1 ← 1 · OP5 ($\overline{\text{C1}}$ · $\overline{\text{OVERFLOW}}$ + OVERFLOW · $\overline{\text{CL.R.E.}}$) · S2PGL<br>SET SY3IDFF and SY4IDFF to 11 CCP · STOP+1 ← 1 · OP5 ($\overline{\text{C1}}$ · $\overline{\text{OVERFLOW}}$ + OVERFLOW · $\overline{\text{CL.R.E.}}$) · S3PGL<br>SET SY5SBFF CCP · STOP+1 ← 1 · OP5 · C1 · S3PGL<br>SET SY6CBFF DDP · STOP+1 ← 1 · OP5 · C1 · S2PGL<br>SET SY7CBFF CCP · STOP+1 ← 1 · OP5 · C1 · S1PGL<br>SET SY8CBFF CCP · STOP + 1 ← 1 · OP5 · C1 · S0PGL |
| 100-24 | RESET SY5CBFF CCP · OP5 · $\overline{\text{C1}}$ · S3PGL · STOP+1 ← 1 · C5 · =<br>RESET SY6CBFF CCP · OP5 · $\overline{\text{C1}}$ · S2PGL · STOP + 1 ← 1 · C6 · =<br>RESET SY7CBFF CCP · OP5 · C1 · $\overline{\text{S1PGL}}$ · STOP+1 ← 1 · C7 · =<br>RESET SY8CBFF CCP . OP5 . $\overline{\text{C1}}$ · S0PGL · STOP+1 ← 1 · C8 · = |
| 100-25 | SET STOP+1 ← 1 · CCP<br>RESET CCP · S6 · STOP+1F |
| 100-26 | SET - CCP · S6 . [OP5 · = · STOP+1F + OP5 · OVERFLOW · $\overline{\text{CL.R.E.}}$ · STOP+1F + OP5 · OVERFLOW · CL.R.E. + OP6 (SY.UNL.REG. SET + OVERFLOW + = · $\overline{\text{C1}}$) + OP14 C1 · STOP+1F]RESET - S12 |
| 100-28 | SET - CCP . S6 · OP.COMP.F. · $\overline{\text{CONT.R.E.}}$ · $\overline{\text{OP14}}$ RESET - S12 |
| 100-30 | SET - CCP . S6 . OVERFLOW · CL.R.E. · OP5 RESET - S12 |
| 100-32 | SET - CCP · S6 · [OP5 · = · C1 + OP6 · = · C1 + OP14 · C1 · STOP+1 ← 1] RESET - S12 |
| 100-34 | SET - CCP · S6 · OP14 STOP+1 F · SY8IDF RESET - S12 |
| 100-36 | SET - CCP · S6 · OP14 · STOP+1F · SY7IDF RESET - S12 |
| 100-38 | SET - CCP · S6 · OP14 · STOP+1F · SY6IDF RESET - S12 |
| 100-40 | SET - CCP . S6 · OP14 · STOP+1F · SY5IDF RESET - S12 |
| CFBTS = | SOPGL · C8 + S1PGL . C7 + S2PGL · C6 + S3PGL · C5 |
| $\overline{\text{CFBTS}}$ = | COMPLEMENT OF CFBTS |
| STOP+1 ← 1 = | S6 · (OP5 . $\overline{\text{OVERFLOW}}$ · = + OP5 · OVERFLOW · $\overline{\text{CL.R.E.}}$ + OP14 . C1) |

We claim:

1. A data processing system comprising addressable bulk storage means; processing means; means for coupling the processing means to the bulk storage means; the processing means comprising a plurality of processing subsystems having conflicting contentions for use of addresses of the bulk storage means; communication control means; means for coupling the communication control means to the processing means; the communication control means comprising memory means for storing a plurality of addresses and, associated with each address, a first status indicium indicating whether the address is in use and a second status indicium indicating whether the address was contended for by a subsystem while the address was in use, and address reporting means for providing to the processing means an address which is stored in association with a second status indicium indicating that the address was contended for while in use and a first status indicium indicating that the address is not presently in use.

2. A data processing sytem comprising:

a plurality of data processing subsystems;

bulk storage means having addressable storage locations;

means for coupling each of the data processing subsystems to said bulk storage means;

the data processing subsystems using and contending for the use of addressable storage locations in the bulk storage means;

a communication control unit separate from the bulk storage means and processing subsystems;

means for coupling the data processing subsystems to said communication control unit;

said communication control unit comprising memory means for storing addresses for said bulk storage means and associated with each address, separate status indicia concerning the addresses, means responsive to a contention for access by one of said processing subsystems to a storage location for selectively updating the content of said memory means including means for storing in the memory means status indicia associated with the contended for address which indicates whether the associated address is in use or not in use and means for storing status indicia in the memory means which indicates whether a processing subsystem contended for such address while the address was indicated to be in use, means for inspecting the content of said memory means and for selecting an address stored in the memory means and having status indicia indicating such address is no longer in use but indicating such address was contended for while previously in use, and means for providing the selected address to the coupling means.

3. A system according to claim 2 wherein said processing subsystems are characterized by providing an address of a desired storage location when contending for use thereof; said means for updating comprising means for comparing an address provided by a processing subsystem against the addresses contained in said memory means for an equality therebetween, means responsive to said status indicia for providing a first signal for a storage location which is indicated to be in use and a second signal for a storage location which is indicated not to be in use, and means responsive to an equality and said second signal for storing status indicia in the memory means in association with the address being compared which indicates a storage location in use.

4. A system according to claim 3 wherein said means for updating comprises means responsive to said equality and said first signal for storing status indicia in the memory means in association with the address being compared which indicates a storage location has been contended for while in use.

5. A system according to claim 3 wherein said means for updating comprises means for indicating when all addresses in said memory means have been compared without finding an equality and means responsive to the last named indication for storing the address being compared into said memory means in association with status indicia indicating that the corresponding storage location is in use.

6. A system according to claim 2 wherein the means for inspecting comprises means which when initiated is operable for sequentially scanning through each of said stored addresses and means for monitoring the status indicia associated with each scanned address and detecting those which indicate the associated address is no longer in use but were previously contented for while in use.

7. The system according to claim 2 wherein the status indicia for each address comprises status indicia indicating which one of said processing subsystems contended for such address when it was already in use, and further comprising means for identifying which of the processing subsystems is contending for use, said updating means comprising means responsive to the processing subsystem identifying means for updating the stored status indicia associated with a contended for address to indicate which processing subsystem contended for such address.

8. The system according to claim 7 wherein the address providing means includes gating means responsive to the identifying means for enabling a detected address to be provided to the coupling means only when the indicia of such detected address indicates that it was previously contended for by the presently identified processing subsystem.

9. The system according to claim 2 wherein the processing subsystems are characterized in that each begins use of a storage location in the bulk storage means by reading information therefrom and by ending use by writing information therein, and further characterized in that each processing subsystem provides the contended for address to the communication control means when contending for such address; the system comprising means for providing a first control signal indicating that a processing subsystem has ended its use of a provided address and for providing a second control signal indicating that information has been successfully written therein; the updating means comprising a register for temporarily storing the provided address, means responsive to the first control signal for locating in the memory means the status indicia associated with an address equal to that stored in said register means, said storing means being operative in response to said second control signal for storing status indicia indicating a non-use condition in association with the located address after information has been successfully written into the bulk storage location for the provided address.

10. Apparatus for indicating the status of storage locations in an addressable memory which storage locations are shared by a plurality of control means, the control means providing signals when requesting access to the addressable memory, the signals including the address of the storage location to which access is requested and a command signal indicating whether the request is to begin or is to end use of such storage location, the apparatus comprising:

an input circuit for receiving said signals from said control means;

an output circuit for providing signals back to the control means;

memory means for storing addresses for said addressable memory means and associated with each address is stored status indicia indicating whether the storage location specified by the address is in use or is not in use and also indicating whether a control means contended for the storage location while it was in use;

means responsive to said received signals for updating the stored status indicia and comprising means for locating in the memory means the received address and its associated status indicia and means responsive to a received command signal for setting the located status indicia to indicate the storage location for the associated address is either in use or is not in use depending on whether the command indicates an access is to begin or is to end, respectively;

means for selectively inspecting the status indicia in said memory means and for locating an address associated with status indicia which status indicia indicates that the storage location for the associated address is no longer in use but was contended for while previously in use; and means responsive to such detection for providing the associated address at the output circuit.

11. Apparatus according to claim 10 additionally comprising read means operable for sequentially reading out from the memory means the stored addresses and associated status indicia, wherein the means for inspecting and locating comprises address register means for storing a received address, means for comparing the address stored in said register means with each read out address for a predetermined relationship therebetween and means for causing the read means to read out the stored addresses and associated indicia until the compare means detects said predetermined relationship, and wherein the means for inspecting and locating comprises means for causing the read means to continue reading addresses after said predetermined relationship is detected until stored status indicia for each address in said memory means has been inspected.

12. A data processing system comprising:

a plurality of data processing subsystems;

bulk storage means having addressable storage locations;

means for coupling each of the processing subsystems to said bulk storage means;

the data processing subsystems using and contending for the use of addressable storage locations in the bulk storage means and providing an address of a desired storage location and a command indicating whether to begin or to end use of the address;

a communication control unit;

means for coupling the communication control unit to said processing subsystems;

said communication control unit comprising memory means having a plurality of memory locations, each for storing a bulk storage means address and associated first and second status indicia, the first status indicium indicating whether the storage location identified by the associated address is presently in use and the second status indicium indicating whether the storage location was contended for while indicated to be in use, updating means comprising means for comparing a provided address with each of the addresses stored in said memory means for detecting an equality therebetween, means responsive to the compare means for indicating a lack of equality between the provided address and all of said addresses stored in the memory means, means for monitoring the status indicia associated with each stored address being compared, controllable means for modifying the first and second status indicia associated with each address being compared and control means responsive to one of said begin use commands and the detection of an equality between the address provided with such command and a stored address for controlling the controllable status indicia modifying means thereby causing such associated first status indicium to be modified to indicate an in use status if it presently indicates a non-use status and thereby causing such associated second status indicium to be modified to indicate a contended for status if the first status indicium indicates a presently in use condition, the control means including means responsive to said indication of a lack of equality for storing the address provided with the command into a memory location along with first status indicia which indicates an in use status, means for inspecting the content of said memory means and for detecting an address having first status indicium indicating a non-use condition and second status indicium indicating a contended for condition while previously in use and means responsive to the last mentioned detection for providing a signal back to the coupling means indicating an address is no longer in use that has been contended for.

13. A system according to claim 12 wherein the control means further comprises means responsive to an end use command for causing the modifying means to modify the first status indicium associated with the detected address to indicate a non-use condition.

14. A system according to claim 12 wherein the last mentioned means comprises means for providing the detected address to the coupling means.

15. A data processing system comprising:

a plurality of data processing subsystems;

bulk storage means having addressable storage locations each identified by an address;

means for coupling each of the data processing subsystems to said storage means the data processing subsystems using and contending for the use of addresses in the bulk storage means;

a communication control unit separate from the bulk storage means and processing subsystems;

means for coupling the data processing subsystems to said communication control unit;

said communication control unit comprising memory means for storing addresses for said bulk storage means and associated with each address separate status indicia concerning such address, means responsive to a contention for access by one of said processing subsystems to an address for selectively updating the content of said memory means including means for storing in the memory means status indicia in association with the contended for address which indicates whether the associated address is in use or not in use and means for storing status indicia which indicates whether each one of the processing subsystems contended for such address while the address was indicated to be in use, means for forming a signal identifying a particular processing subsystem which is contending for use, means responsive to said signal for locating in said memory means an address having status indicia indicating such address is no longer in use and which also indicates such address was contended for by the particular data processing subsystem which is identified by said signal while such address was previously in use and means for providing the located address to the coupling means.

16. A system according to claim 15 wherein the memory means comprises addressable memory locations, and the updating means comprises means for locating an address for updating which includes a counter for counting through a series of states for identifying memory locations and means for detecting equality between addresses stored in the identified memory locations and the address being contended for.

17. A system according to claim 16 wherein the means for locating an address to be provided to the coupling means comprises a register for storing a state of the counter, and gating means responsive to the stored status indicia for storing into the register the state of the counter thereby identifying a memory location storing an address associated with status indicia which indicates such address is no longer in use but was contended for by the identified data processing subsystem.

18. Status indicating and storage apparatus for the addresses of a storage means, the apparatus comprising memory means having a plurality of memory locations each for storing an address and associated therewith signal indicia comprising a first signal indicium indicating whether the associated address is in use and a second signal indicium indicating any one of a plurality of initiating means waiting to initiate an access to the associated address of such storage means, register means for storing an address, register means for storing an operator indicating that an address is to be marked in use or not in use, means responsive to the stored operator for comparing the address in said address storing register with the addresses stored in said memory means and upon detecting equality selectively storing a signal indicium in association with the detected address in said memory means thereby marking such address in use or not in use in accordance with the stored operator, and means providing a unique output signal to an initiating means in response to any selected signal indicia whenever the second signal indicium indicates an initiating means is writing to initiate an access and the first signal indicium indicates the associated address is not in use.

19. Status indicating and storage means according to claim 18 comprising a counter for sequentially counting through a plurality of states corresponding to the memory locations in said memory means and means for causing the content of the memory locations corresponding to the states of said counter to be read out for comparison.

20. Status indicating and storage apparatus according to claim 19 wherein memory locations may be effectively empty in that any addresses stored therein are neither in use nor awaiting use, means monitoring the memory locations as they are read out and for detecting an effectively empty one, a further register means, means for storing in the further register means the state of the counter corresponding to an effectively empty memory location, means for providing an output signal upon completing a count through all locations in said memory means, means responsive to said output signal for setting the state of the counter back to the state corresponding to that stored in said further register means and means for storing the address stored in the address register means into the memory location corresponding to the set state of the counter together with a signal indicium determined by the operator.

21. Status indicating and storage means according to claim 20 wherein the monitoring means detects all effectively empty memory locations and the means for storing the state of the counter includes means for overwriting in said further register means the previous stored state of the counter with a new state as each subsequent effectively empty memory location is detected, the address storing means thereby storing into the last effectively empty memory location detected before said output signal.

22. Status indicating and storage means for multiple means which access a common addressable memory means comprising a memory having multiple memory locations each for storing an address for said common memory and associated with each address storing an indication of whether such address is in use and an indication for each of said multiple means of whether each is waiting for access to the associated address when not in use, means for scanning said memory locations and for causing the contents to be read out one by one, means for designating one of said multiple means and means for monitoring the readout from said memory for an address which has associated indications identifying that the multiple means identified by said designating means is waiting for access to the associated address and indicating that such address is not in use, and means responsive to the monitoring of such an address and being further responsive to the designating means for providing a predetermined signal to the multiple means identified by said designating means.

23. Status indicating the storage means according to claim 22 including a temporary storage means, and means responsive to said monitoring means for selectively storing a signal in the temporary storage means corresponding to a memory means storage location having a stored address with associated indications designating that such address is not in use and that the multiple means designated by said designating means is waiting for access to such address, and means for selectively resetting the scanning means back to the memory storage location which corresponds to the signal contained in said temporary storing means.

24. Status indicating and storage means according to claim 23 wherein said means for selectively storing is operative for storing a signal corresponding to only one storage location at any one time and includes means for overwriting a previously stored signal as the memory is scanned.

25. Status indicating and storage means according to claim 22 including means for selectively coupling an address back to the multiple means which is indicated by the designating means.

26. Apparatus for indicating the status of addresses of addressable memory means, which comprises control means for providing memory addresses and control signals and for initiating accesses to the addressable memory means at the provided memory addresses; a control memory for storing memory addresses each together with an associated indicia comprising a status indicium indicating whether the control means is waiting to access at the associated address and a use indicium indicating whether the associated address is in use; means for updating the control memory including means for receiving a provided address and an associated control signal directing such address to be marked in use or marked not in use, means for storing the received control signal, address register means for storing the received address, means for comparing the address stored in the address register means with the individual addresses in the control memory and for detecting an address equal to the received address, and means responsive to the stored control signal and a detected equality for changing the indicia associated with the detected address in accordance with the stored control signal; and means for selectively inspecting the stored indicia and for providing an output indication to the control means indicating that a particular address provided by the control means is not in use and that the control means is waiting to initiate an access therein.

* * * * *